US008305999B2

(12) United States Patent
Palanki et al.

(10) Patent No.: US 8,305,999 B2
(45) Date of Patent: Nov. 6, 2012

(54) RESOURCE ALLOCATION AND MAPPING IN A WIRELESS COMMUNICATION SYSTEM

(76) Inventors: Ravi Palanki, San Diego, CA (US); Alexei Gorokhov, San Diego, CA (US); Aamod Khandekar, San Diego, CA (US); Naga Bhushan, San Diego, CA (US)

( * ) Notice: Subject to any disclaimer, the term of this patent is extended or adjusted under 35 U.S.C. 154(b) by 1023 days.

(21) Appl. No.: 11/969,200

(22) Filed: Jan. 3, 2008

(65) Prior Publication Data
US 2008/0165743 A1    Jul. 10, 2008

Related U.S. Application Data

(60) Provisional application No. 60/883,729, filed on Jan. 5, 2007, provisional application No. 60/883,758, filed on Jan. 5, 2007.

(51) Int. Cl.
*H04B 7/216* (2006.01)
(52) U.S. Cl. ........................................ 370/335; 370/441
(58) Field of Classification Search .................. 370/335, 370/329, 336, 343, 437, 134, 132; 375/260; 714/701; 455/452.1
See application file for complete search history.

(56) References Cited

U.S. PATENT DOCUMENTS

| | | | | |
|---|---|---|---|---|
| 5,841,813 | A * | 11/1998 | van Nee | 375/279 |
| 6,259,686 | B1 * | 7/2001 | Blanc et al. | 370/337 |
| 7,054,301 | B1 * | 5/2006 | Sousa et al. | 370/343 |
| 7,079,496 | B1 * | 7/2006 | Kockmann et al. | 370/280 |
| 7,280,580 | B1 * | 10/2007 | Haartsen | 375/138 |
| 2003/0058829 | A1 * | 3/2003 | Batra | 370/345 |
| 2003/0105996 | A1 * | 6/2003 | Dagan et al. | 714/701 |
| 2003/0147453 | A1 | 8/2003 | Batra | |
| 2004/0028120 | A1 * | 2/2004 | Bott et al. | 375/135 |
| 2004/0190640 | A1 * | 9/2004 | Dubuc et al. | 375/260 |
| 2005/0002369 | A1 * | 1/2005 | Ro et al. | 370/342 |
| 2005/0157638 | A1 * | 7/2005 | Maltsev et al. | 370/203 |
| 2005/0165949 | A1 * | 7/2005 | Teague | 709/236 |

(Continued)

FOREIGN PATENT DOCUMENTS

JP        2008526123 A    7/2008
(Continued)

OTHER PUBLICATIONS

Jim Tomcik, Nov. 2005 QFDD Technology Overview Presentation,IEEE 802.20 Working Group on Mobile Wireless Access.*

(Continued)

*Primary Examiner* — Bunjob Jaroenchonwanit
(74) *Attorney, Agent, or Firm* — Peng Zhu; Sayed H. Beladi

(57) ABSTRACT

Techniques for allocating and mapping resources in a wireless communication system are described. The system may use hop-ports to facilitate allocation and use of subcarriers. In one aspect, the hop-ports may be partitioned into multiple subzones, with each subzone including a configurable number of hop-ports. The hop-ports within each subzone may be permuted or shuffled based on a permutation function. After permutation, the hop-ports in all subzones may be mapped to the subcarriers based on local or global hopping. In another aspect, a set of hop-ports may be mapped to a set of subcarriers. A hop-port may be mapped to an unavailable subcarrier and may then be remapped to another available subcarrier. In yet another aspect, a set of hop-ports may be mapped to a set of subcarriers distributed (e.g., evenly) across all subcarriers but avoiding subcarriers in a reserved zone.

39 Claims, 17 Drawing Sheets

U.S. PATENT DOCUMENTS

| | | | |
|---|---|---|---|
| 2005/0281242 A1 | 12/2005 | Sutivong et al. | |
| 2006/0067293 A1* | 3/2006 | Santhoff et al. | 370/347 |
| 2006/0072649 A1* | 4/2006 | Chang et al. | 375/132 |
| 2006/0146760 A1 | 7/2006 | Khandekar et al. | |
| 2006/0223449 A1* | 10/2006 | Sampath et al. | 455/69 |
| 2006/0274679 A1 | 12/2006 | Khandekar et al. | |
| 2006/0291656 A1* | 12/2006 | Dalmases et al. | 380/268 |
| 2007/0041429 A1* | 2/2007 | Khandekar | 375/146 |
| 2007/0223606 A1* | 9/2007 | Yang et al. | 375/260 |
| 2008/0049692 A1* | 2/2008 | Bachu et al. | 370/338 |
| 2008/0062936 A1* | 3/2008 | He et al. | 370/338 |
| 2008/0090574 A1* | 4/2008 | Soong et al. | 455/442 |
| 2008/0101307 A1* | 5/2008 | Sindhushayana et al. | 370/337 |
| 2008/0165743 A1* | 7/2008 | Palanki et al. | 370/335 |
| 2008/0261610 A1* | 10/2008 | Villier | 455/452.1 |
| 2009/0061778 A1* | 3/2009 | Vrzic et al. | 455/62 |
| 2009/0116435 A1* | 5/2009 | Koorapaty et al. | 370/329 |
| 2011/0216808 A1* | 9/2011 | Tong et al. | 375/135 |

FOREIGN PATENT DOCUMENTS

| | | |
|---|---|---|
| JP | 2008526141 A | 7/2008 |
| RU | 2181229 C1 | 4/2002 |
| WO | 2006069301 | 6/2006 |
| WO | 2006138625 | 12/2006 |

OTHER PUBLICATIONS

Jim Tomcik , Oct. 28, 2005 QFDD and QTDD:Technology Overview, IEEE802.20 Working Group on Mobile Wireless Access.*

TIA-1121.001 "Physical Layer for Ultra Mobile Broadband (UMB) Air Interface Specification," 3GPP2 C. S0084-001Version 2.0, (Aug. 2007).

International Search Report—PCT/US08/050211—International Search Authority—European Patent Office—Sep. 19, 2008.

Written Opinion—PCT/US08/050211—International Search Authority—European Patent Office, Munich—Sep. 19, 2008.

Taiwan Search Report—TW097100639—TIPO—Jun. 28, 2011.

* cited by examiner

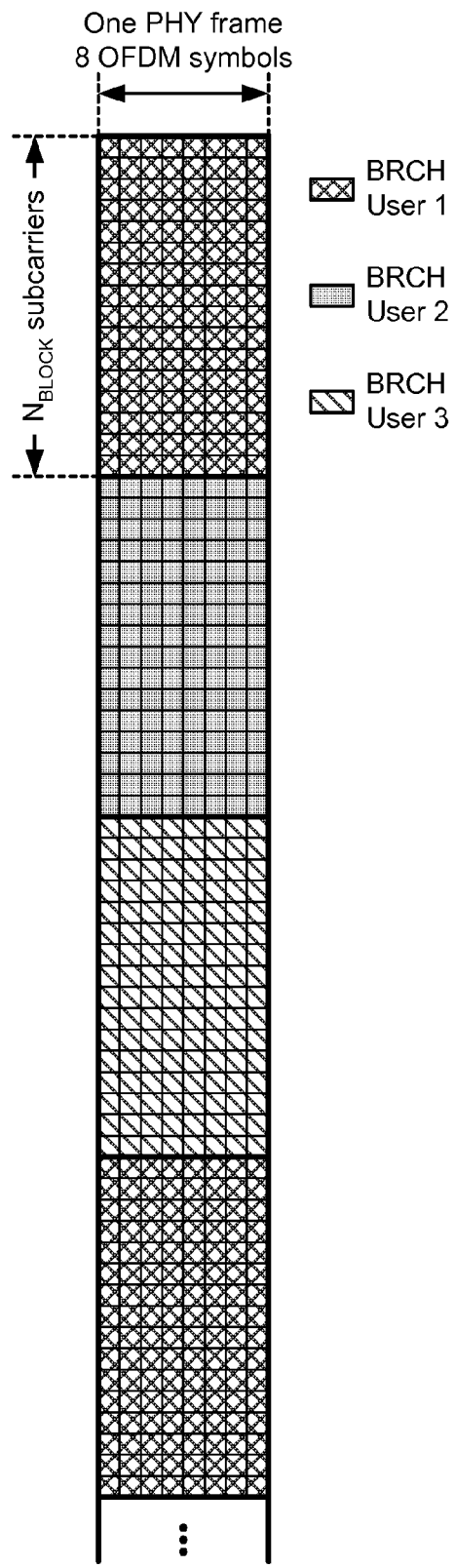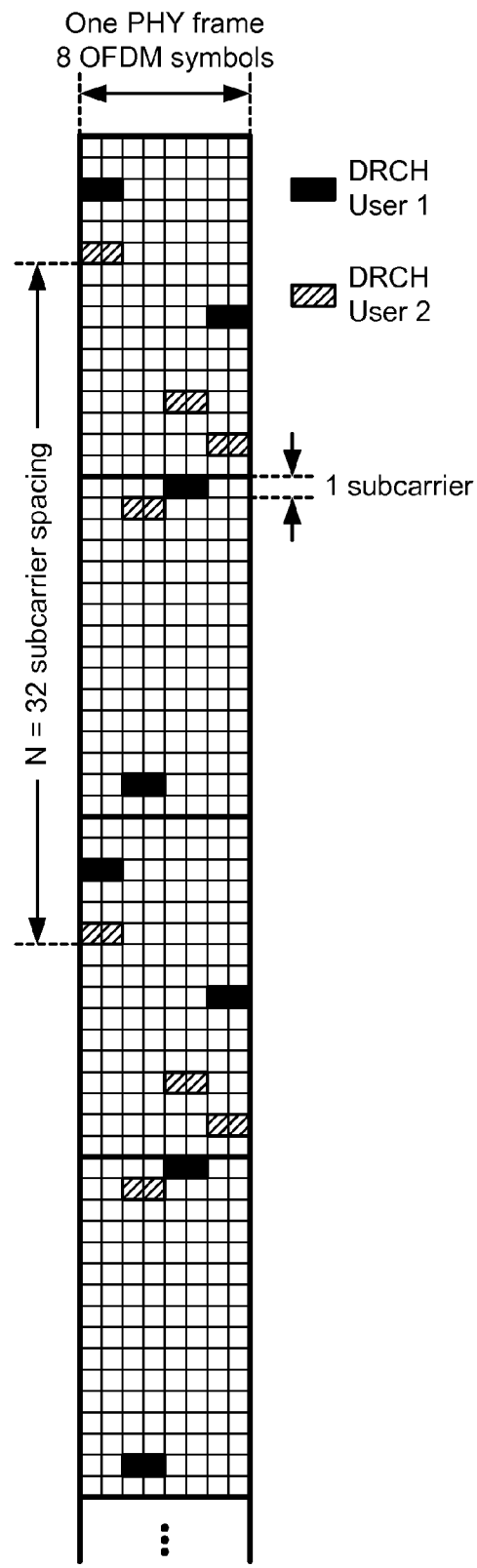
*FIG. 9A*
*FIG. 9B*

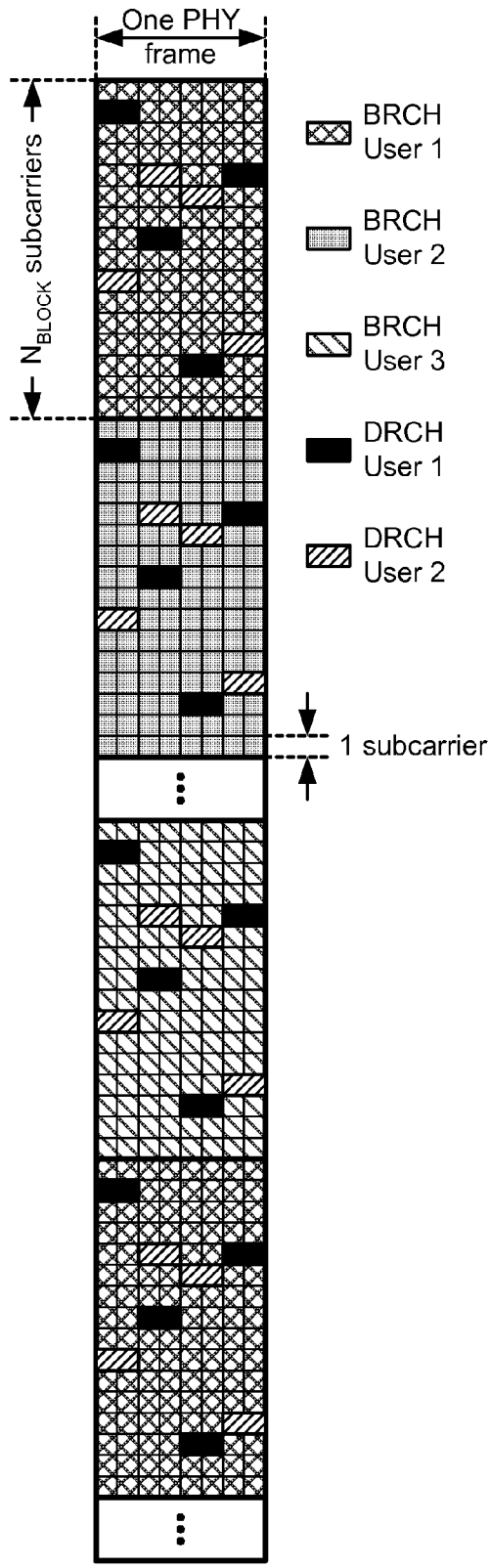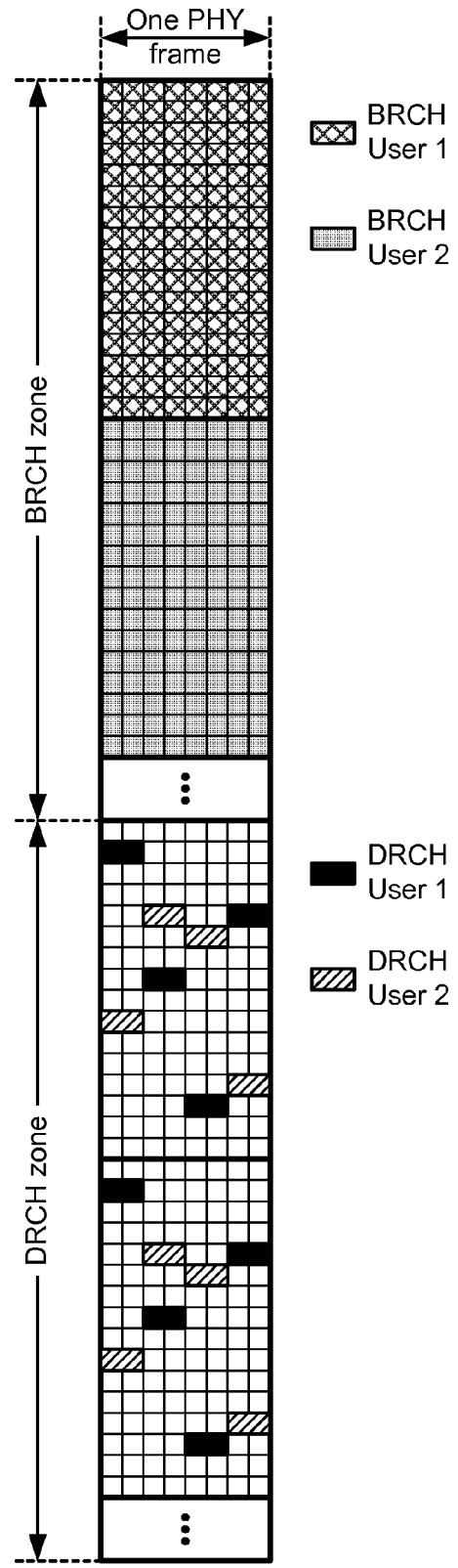
FIG. 10A
FIG. 10B

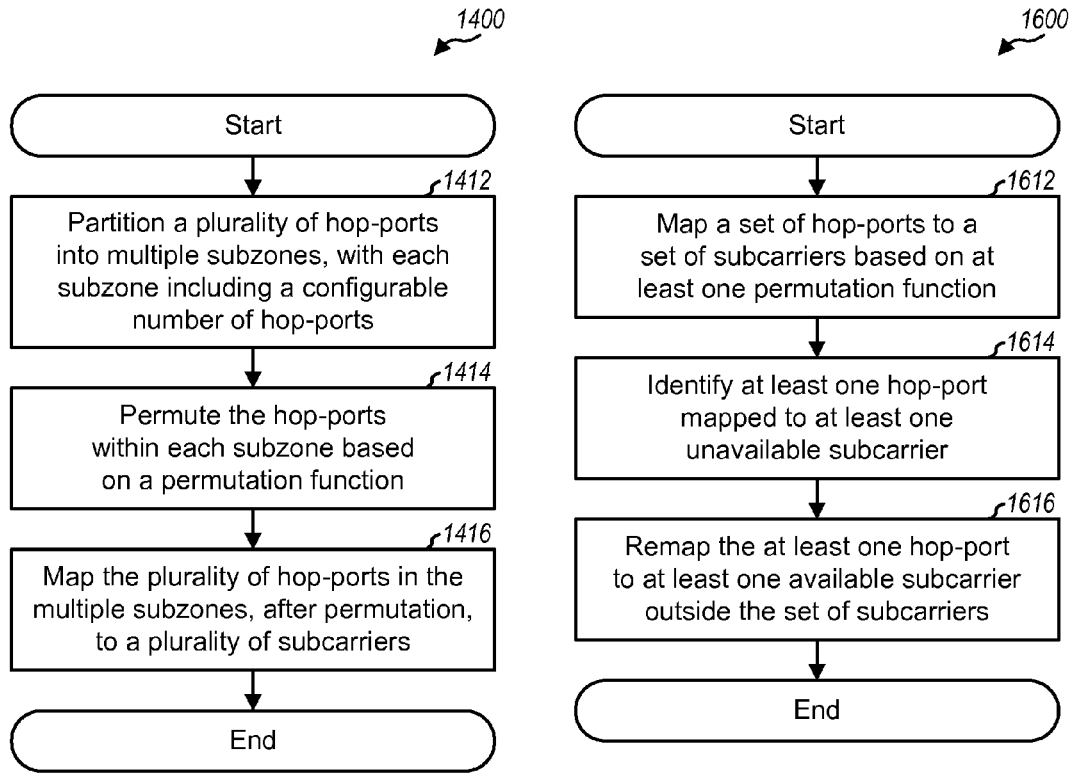
*FIG. 14*
*FIG. 16*
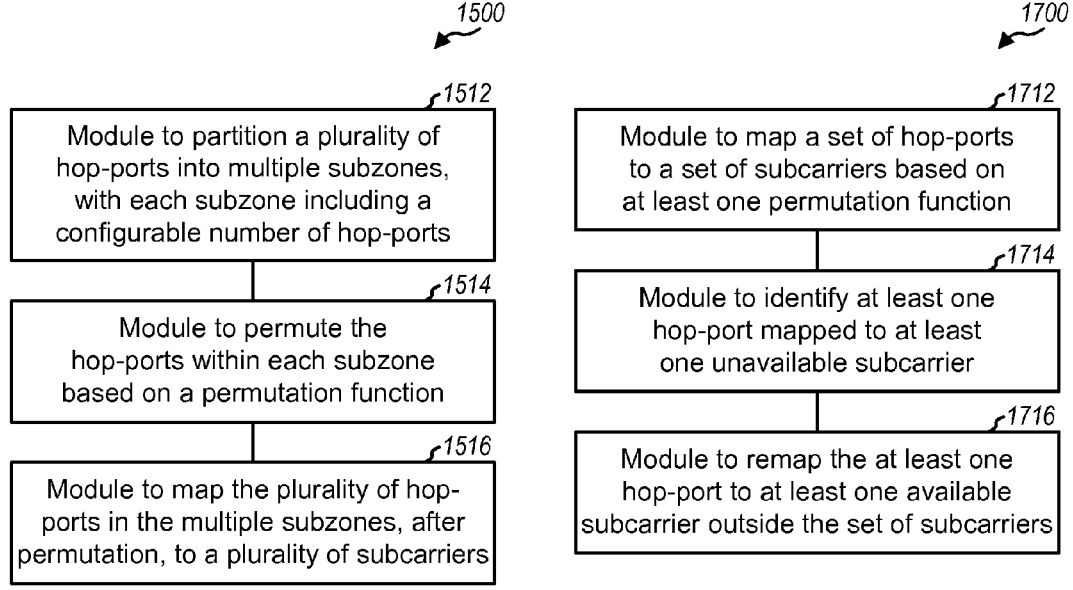
*FIG. 15*
*FIG. 17*

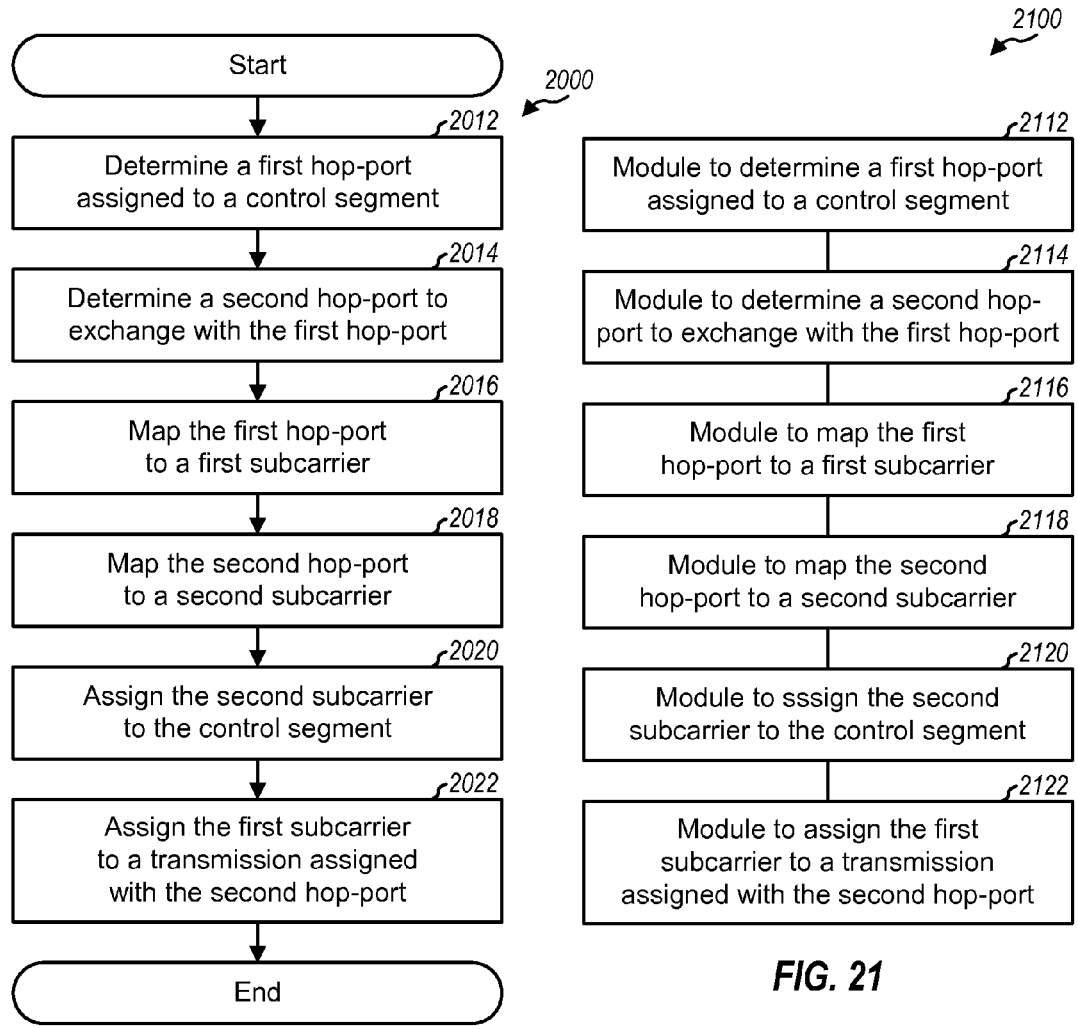
FIG. 20
FIG. 21
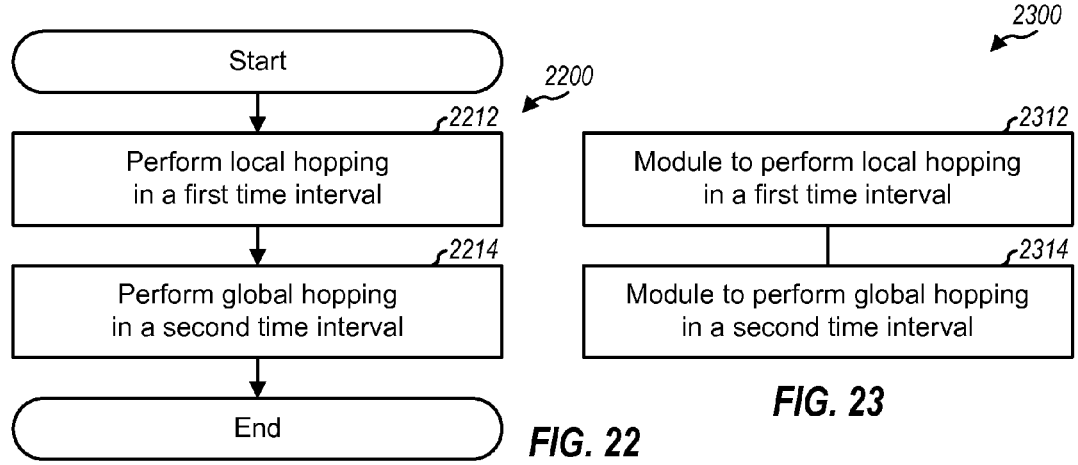
FIG. 22
FIG. 23

RESOURCE ALLOCATION AND MAPPING IN A WIRELESS COMMUNICATION SYSTEM

The present application claims priority to provisional U.S. Application Ser. No. 60/883,729, entitled "RESOURCE ALLOCATION AND MAPPING IN A WIRELESS COMMUNICATION SYSTEM," and provisional U.S. Application Ser. No. 60/883,758, entitled "WIRELESS COMMUNICATION SYSTEM," both filed Jan. 5, 2007, assigned to the assignee hereof and incorporated herein by reference.

BACKGROUND

I. Field

The present disclosure relates generally to communication, and more specifically to techniques for allocating and mapping resources in a wireless communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include many base stations that can support communication for many terminals on the forward and reverse links. The forward link (or downlink) refers to the communication link from the base stations to the terminals, and the reverse link (or uplink) refers to the communication link from the terminals to the base stations. The system may have a certain amount of time frequency resources for each link. It may be desirable to have an efficient scheme for allocating and mapping the available resources on each link.

SUMMARY

Techniques for allocating and mapping resources in a wireless communication system are described herein. The system may have $N_{FFT}$ subcarriers that may be obtained via orthogonal frequency division multiplexing (OFDM) or some other modulation techniques. Hop-ports may be defined to facilitate allocation and use of the $N_{FFT}$ subcarriers. The hop-ports may be considered as logical/virtual subcarriers that may be mapped to physical subcarriers. In the description herein, the term "subcarrier" refers to physical subcarrier unless noted otherwise.

In one aspect, a plurality of hop-ports may be partitioned into multiple subzones, with each subzone including a configurable number of hop-ports. The hop-ports within each subzone may be permuted or shuffled based on a permutation function, which may be different for each subzone and each sector. After permutation, the plurality of hop-ports in the multiple subzones may be mapped to a plurality of subcarriers, e.g., based on local hopping (LH), global hopping (GH), block resource channel (BRCH), or distributed resource channel (DRCH), which are described in detail below.

In another aspect, a set of hop-ports may be mapped to a set of subcarriers based on at least one permutation function. At least one hop-port mapped to at least one unavailable subcarrier may be identified and may be remapped to at least one available subcarrier outside the set of subcarriers.

In yet another aspect, at least one zone of subcarriers usable for transmission but to be avoided is determined. A set of hop-ports may be mapped to a set of subcarriers distributed (e.g., evenly) across a plurality of subcarriers and avoiding the subcarriers in the at least one zone.

In yet another aspect, hopping may be performed after exchanging hop-ports. A first hop-port assigned to a control segment may be determined. A second hop-port to exchange with the first hop-port may be determined. The first and second hop-ports may be mapped to first and second subcarriers, respectively. The second subcarrier may be assigned to the control segment, and the first subcarrier may be assigned to a transmission assigned with the second hop-port.

In yet another aspect, local hopping (e.g., LH or BRCH) may be performed in a first time interval, and global hopping (e.g., GH or DRCH) may be performed in a second time interval. Local and global hopping may be performed in different time intervals, e.g., for different HARQ interlaces. Local and global hopping may also be performed in the same time interval, e.g., local hopping may be performed for a first group of subcarriers, and global hopping may be performed for a second group of subcarriers.

Various aspects and features of the disclosure are described in further detail below.

BRIEF DESCRIPTION OF THE DRAWINGS

FIG. 9A shows a BRCH structure.
FIG. 9B shows a DRCH structure.
FIG. 10A shows multiplexing mode 1 for the BRCH and DRCH structures.
FIG. 10B shows multiplexing mode 2 for the BRCH and DRCH structures.
FIG. 14 shows a process for mapping hop-ports to subcarriers.
FIG. 15 shows an apparatus for mapping hop-ports to subcarriers.
FIG. 16 shows a process for hopping with remapping.
FIG. 17 shows an apparatus for hopping with remapping.
FIG. 20 shows a process for hopping with exchanged hop-ports.
FIG. 21 shows an apparatus for hopping with exchanged hop-ports.
FIG. 22 shows a process for performing local and global hopping.
FIG. 23 shows an apparatus for performing local and global hopping.

DETAILED DESCRIPTION

The techniques described herein may be used for various wireless communication systems such as CDMA, TDMA, FDMA, OFDMA and SC-FDMA systems. The terms "system" and "network" are often used interchangeably. A CDMA system may implement a radio technology such as cdma2000, Universal Terrestrial Radio Access (UTRA), etc. An OFDMA system may implement a radio technology such as Ultra Mobile Broadband (UMB), Evolved UTRA (E-UTRA), IEEE 802.16, IEEE 802.20, Flash-OFDM®, etc. UTRA and E-UTRA are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for UMB, and UMB terminology is used in much of the description below. UMB is described in 3GPP2 C.S0084-001, entitled "Physical Layer for Ultra Mobile Broadband (UMB) Air Interface Specification," August 2007, which is publicly available.

Figure 1:
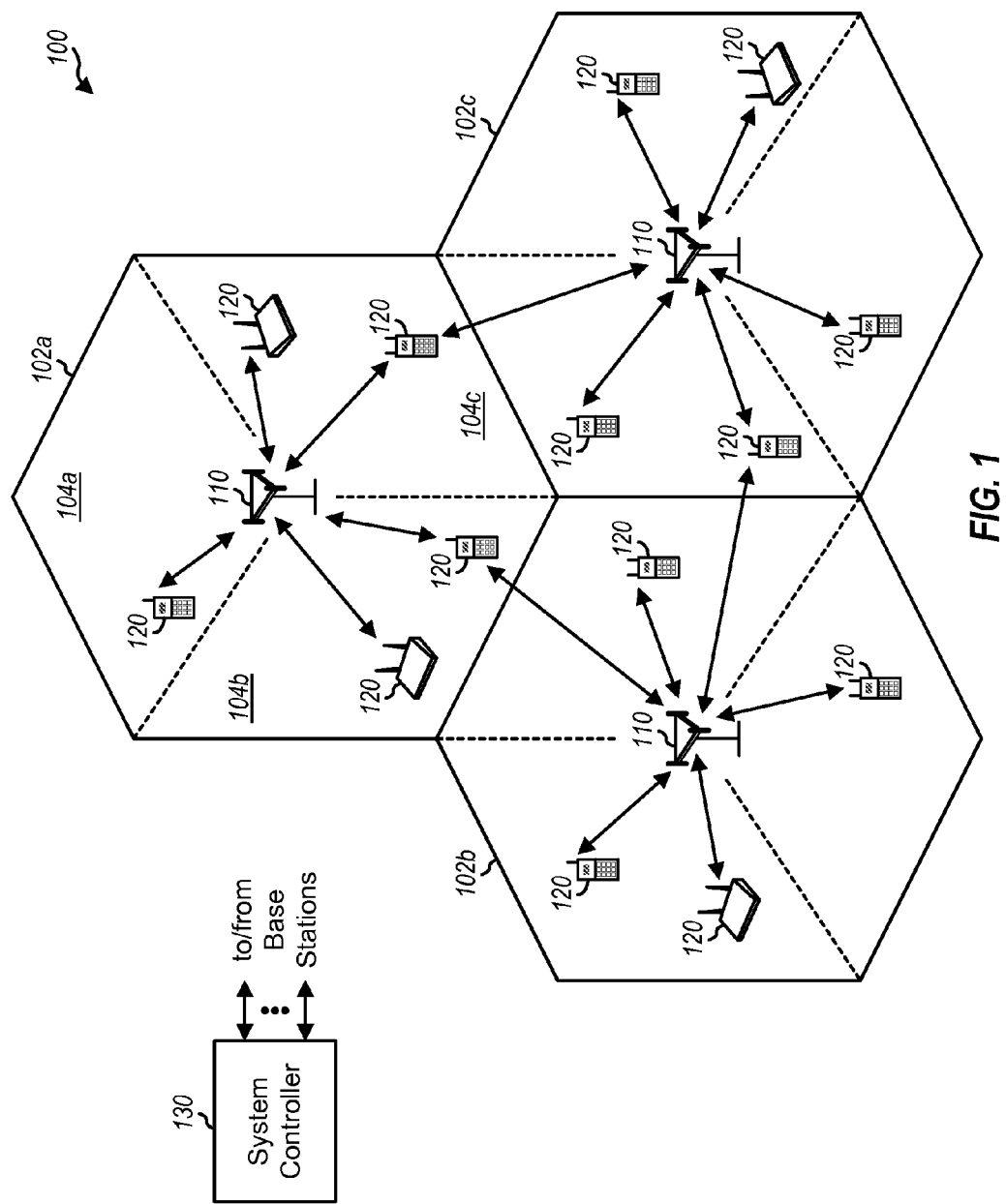
FIG. 1 shows a wireless communication system.

FIG. 1 shows a wireless communication system 100, which may also be referred to as an access network (AN). System 100 may include multiple base stations 110. A base station is a station that communicates with the terminals and may also be referred to as an access point, a Node B, an evolved Node B, etc. Each base station provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area may be served by a respective base station subsystem. The term "sector" can refer to the smallest coverage area of a base station and/or a base station subsystem serving this coverage area.

Terminals 120 may be dispersed throughout the system, and each terminal may be stationary or mobile. A terminal may also be referred to as an access terminal (AT), a mobile station, a user equipment, a subscriber station, a station, etc. A terminal may be a cellular phone, a personal digital assistant (PDA), a wireless communication device, a wireless modem, a handheld device, a laptop computer, a cordless phone, etc. A terminal may communicate with zero, one, or multiple base stations on the forward and/or reverse links at any given moment.

For a centralized architecture, a system controller 130 may couple to base stations 110 and provide coordination and control for these base stations. System controller 130 may be a single network entity or a collection of network entities. For a distributed architecture, the base stations may communicate with one another as needed.

Figure 2:
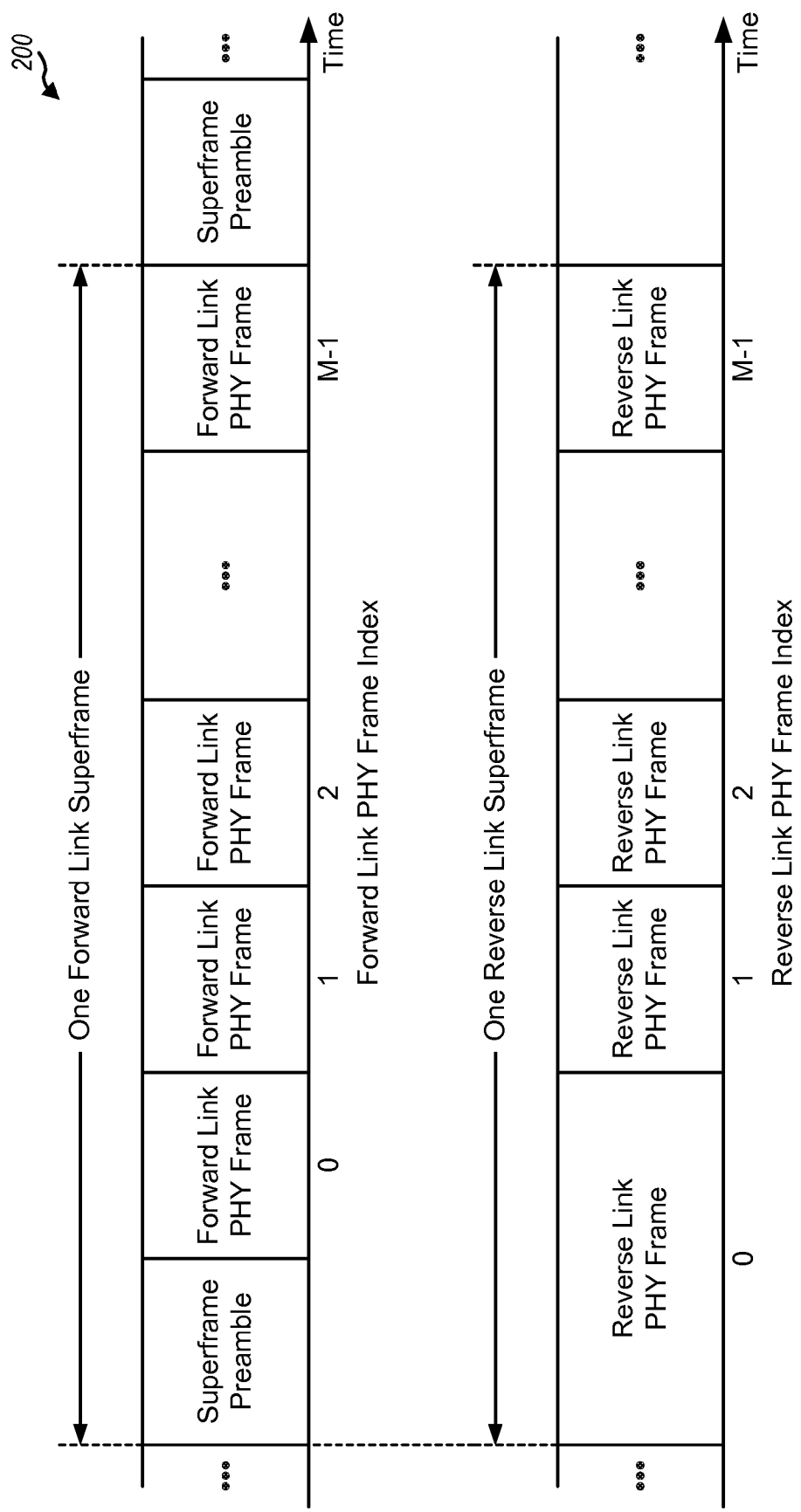
FIG. 2 shows a superframe structure.

FIG. 2 shows a design of a superframe structure 200. The transmission timeline for each link may be partitioned into units of superframes. Each superframe may span a particular time duration, which may be fixed or configurable. For the forward link (FL), each superframe may include a preamble followed by M physical layer (PHY) frames, where M may be any integer value. In general, the term "frame" may refer to a time interval in a transmission timeline or a transmission sent during the time interval, depending on the context in which the term is used. In one design, each superframe includes M=25 PHY frames with indices of 0 through 24. The superframe preamble may carry system information and acquisition pilots that may enable terminals to acquire and access the system. Each PHY frame may carry traffic data, control information/signaling, pilot, etc. For the reverse link (RL), each superframe may include M PHY frames, where the first PHY frame may be extended by the length of the superframe preamble on the forward link. The superframes on the reverse link may be time aligned with the superframes on the forward link.

The base stations may transmit data and control information on each FL PHY frame to the terminals. The terminals (e.g., if scheduled) may transmit data and control information on each RL PHY frame to the base stations. A base station and a terminal may simultaneously transmit and receive data and control information via the forward and reverse links.

The system may utilize OFDM on the forward and/or reverse link. OFDM may partition the system bandwidth for each link into multiple ($N_{FFT}$) orthogonal subcarriers, which may also be referred to as tones, bins, etc. Each subcarrier may be modulated with data. The spacing between adjacent subcarriers may be fixed, and the number of subcarriers may be dependent on the system bandwidth. For example, $N_{FFT}$ may be equal to 128, 256, 512, 1024 or 2048 for system bandwidth of 1.25, 2.5, 5, 10 or 20 MHz, respectively. Only a subset of the $N_{FFT}$ total subcarriers may be usable for transmission, and the remaining subcarriers may serve as guard subcarriers to allow the system to meet spectral mask requirements. The $N_{FFT}$ total subcarriers may include $N_{USABLE}$ usable subcarriers and $N_{GUARD}$ guard subcarriers, where $N_{FFT} = N_{USABLE} + N_{GUARD}$.

Table 1 lists some parameters for the system and provides an example value for each parameter. Other values may also be used for these parameters. For clarity, many of the examples below are based on the example parameter values shown in Table 1.

TABLE 1

| Symbol | Description | Example Value |
|---|---|---|
| $N_{FFT}$ | Total number of subcarriers | 512 |
| $N_{USABLE}$ | Number of usable subcarriers | 480 |
| $N_{GUARD}$ | Number of guard subcarriers | 32 |
| $N_{GUARD,LEFT}$ | Number of guard subcarriers on left edge | 16 |
| $N_{CDMA-SUBSEGMENT}$ | Number of subcarriers for a CDMA subsegment | 128 |
| $N_{AVAILABLE}$ | Number of nominally available subcarriers | 352 |
| $N_{BLOCK}$ | Number of subcarriers per block | 16 |
| $N_{FRAME}$ | Number of OFDM symbol periods per PHY frame | 8 |
| $N_{SUBZONE,MAX}$ | Maximum number of hop-ports per subzone | 64 or 128 |

The system may utilize a CDMA segment that can support transmission of pilot, control information, and some traffic data on the reverse link. The CDMA segment may include C CDMA subsegments, where in general $C \geq 1$. Each CDMA subsegment may occupy $N_{CDMA-SUBSEGMENT}$ contiguous subcarriers in each CDMA frame. A CDMA frame is a PHY frame in which the CDMA segment is sent.

Figure 3:
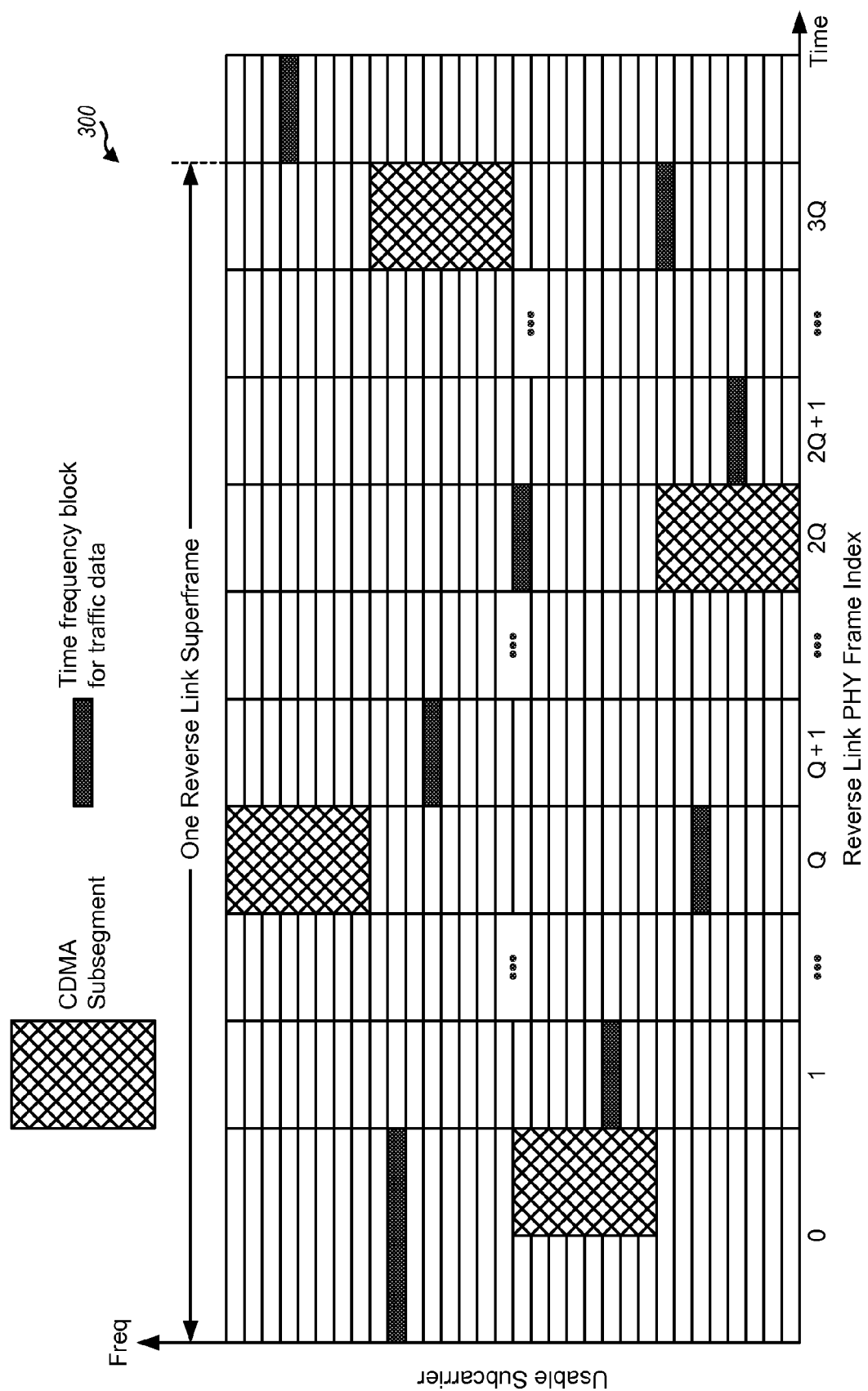
FIG. 3 shows a CDMA segment.

FIG. 3 shows a design of a CDMA segment 300. In this design, the CDMA segment includes one CDMA subsegment and is sent every Q PHY frames, where Q may be equal to 4, 6, 8, etc. The CDMA subsegment may hop across the system bandwidth from CDMA frame to CDMA frame to achieve frequency diversity.

Figure 4:
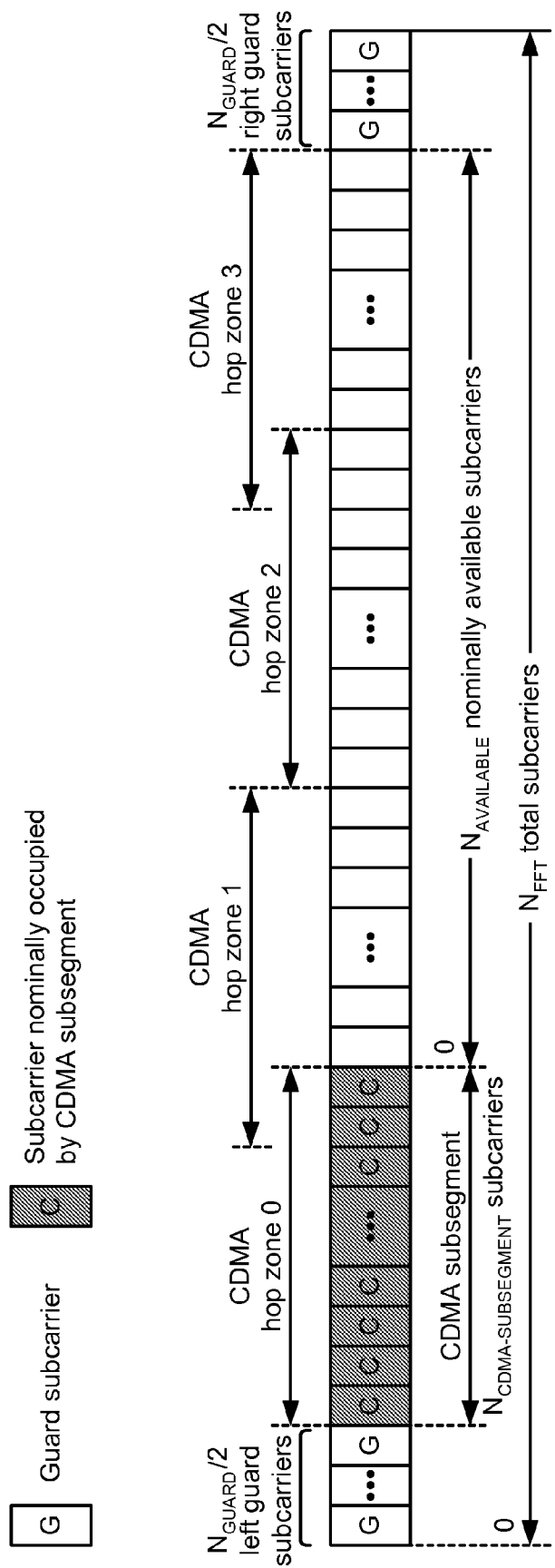
FIG. 4 shows CDMA hop zones for a CDMA subsegment.

FIG. 4 shows a design of CDMA hop zones for a CDMA subsegment. Multiple CDMA hop zones may be defined over the $N_{USABLE}$ usable subcarriers, with each CDMA hop zone covering $N_{CDMA-SUBSEGMENT}$ contiguous subcarriers. Each pair of CDMA hop zones may be non-overlapping with other pairs of CDMA hop zones. The two CDMA hop zones in each pair may overlap, as shown in FIG. 4, with the amount of overlap being dependent on the number of guard subcarriers. The CDMA subsegment may occupy one CDMA hop zone in each CDMA frame.

The C CDMA subsegments may nominally occupy C non-overlapping CDMA hop zones. For example, CDMA subsegment c may nominally occupy CDMA hop zone 2*c when each pair of CDMA hop zones overlap as shown in FIG. 4. CDMA subsegment c may hop and occupy another CDMA hop zone in each CDMA frame.

A subcarrier may be nominally available for transmission if it is not nominally occupied by a CDMA subsegment and also if it is not a guard subcarrier. The number of nominally available subcarriers, $N_{AVAILABLE}$, may be given as:

$$N_{AVAILABLE} = N_{FFT} - N_{GUARD} - C * N_{CDMA-SUBSEGMENT}. \quad \text{Eq (1)}$$

$N_{CDMA-SUBSEGMENT}$ may be a function of PHY frame index and may be different for different PHY frames. In particular, $N_{CDMA-SUBSEGMENT}$ may be dependent on whether or not any CDMA subsegment is being sent in a PHY frame and, if yes, the number of CDMA subsegments being sent.

The $N_{FFT}$ total subcarriers may be assigned indices 0 through $N_{FFT}-1$, and the $N_{AVAILABLE}$ nominally available subcarriers may be assigned indices 0 through $N_{AVAILABLE}-1$. In the example shown in FIG. 4, one CDMA subsegment nominally occupies the $N_{CDMA-SUBSEGMENT}$ subcarriers in CDMA hop zone 0, and the $N_{AVAILABLE}$ nominally available subcarriers include the remaining usable subcarriers. The $N_{AVAILABLE}$ nominally available subcarriers may not be contiguous if there are multiple CDMA subsegments.

The system may support spatial division multiple access (SDMA) on the forward and/or reverse link. For SDMA on the forward link, a base station may transmit data to multiple terminals simultaneously on a given subcarrier via multiple transmit antennas. For SDMA on the reverse link, a base station may receive data from multiple terminals simultaneously on a given subcarrier via multiple receive antennas. SDMA may be used to improve performance (e.g., increase throughput) by supporting multiple simultaneous transmissions on a given subcarrier.

Figure 5:
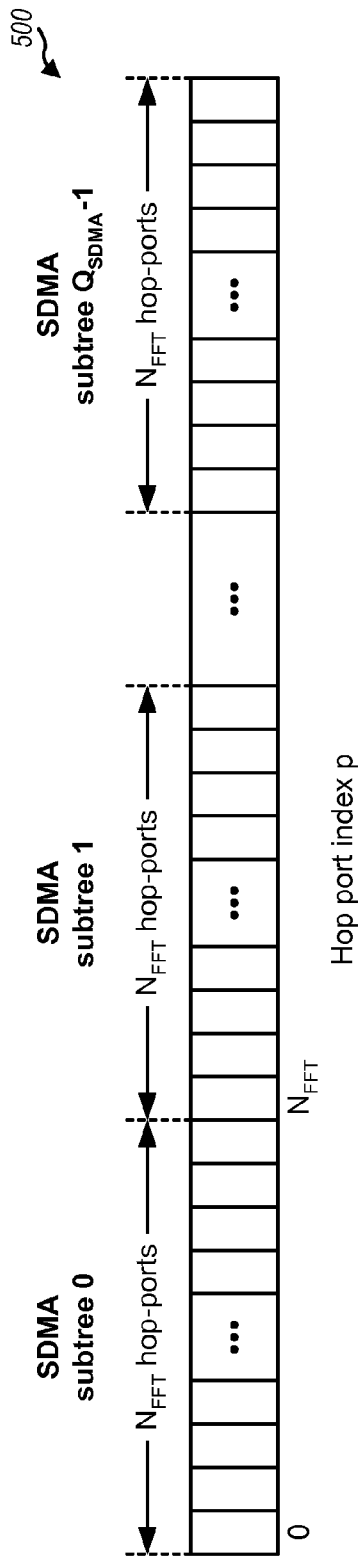
FIG. 5 shows a hop-port structure.

FIG. 5 shows a design of an SDMA tree structure 500 that may be used for the forward and/or reverse link. The system may support up to $Q_{SDMA}$ simultaneous transmissions on a given subcarrier. A tree structure with $Q_{SDMA}$ SDMA subtrees may be formed, with each SDMA subtree including $N_{FFT}$ hop-ports. A total of $Q_{SDMA}*N_{FFT}$ hop-ports may be defined and assigned indices of 0 through $Q_{SDMA}*N_{FFT}-1$. Each hop-port may be associated with an index p, where $p \in \{0, \ldots, Q_{SDMA}*N_{FFT}-1\}$.

Figure 6:
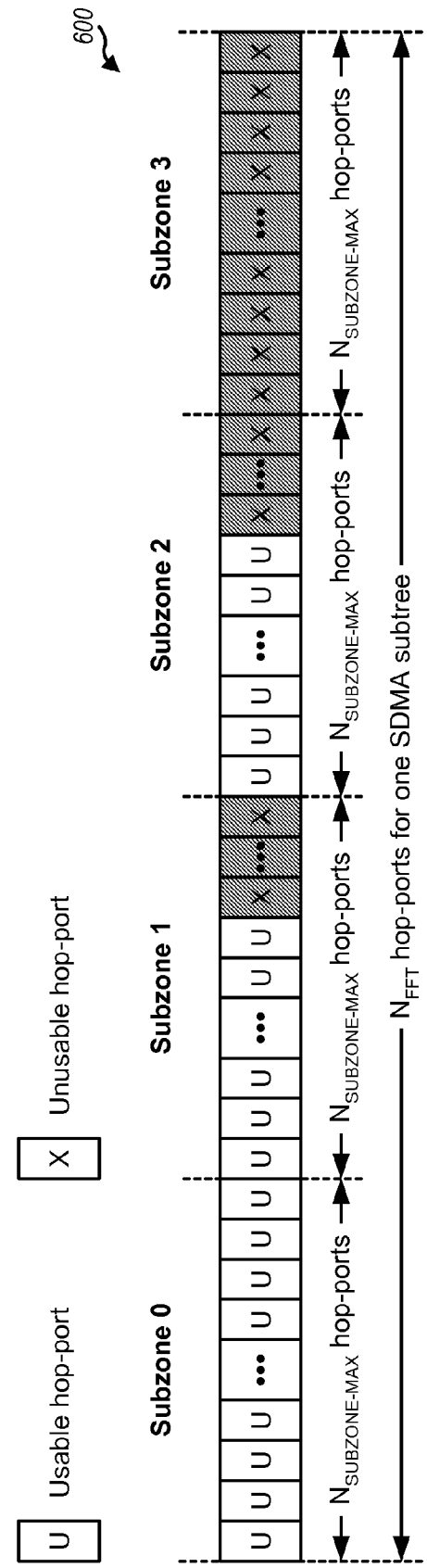
FIG. 6 shows partitioning of hop-ports to subzones.

FIG. 6 shows a design of a hop-port structure 600. The $N_{FFT}$ hop-ports for each SDMA subtree may be partitioned into $N_{FFT}/N_{SUBZONE,MAX}$ subzones, with each subzone including $N_{SUBZONE,MAX}$ consecutive hop-ports in the SDMA subtree. Thus, subzone 0 may include hop-ports 0 through $N_{SUBZONE,MAX}-1$, subzone 1 may include hop-ports $N_{SUBZONE,MAX}$ to $2N_{SUBZONE,MAX}-1$, etc. $N_{SUBZONE,MAX}$ may be a configurable value selected by the system. $N_{AVAILABLE}$ hop-ports may be usable and may be mapped to the $N_{AVAILABLE}$ nominally available subcarriers. The first S subzones may include the usable hop-ports and may be assigned indices of 0 through S-1. The number of usable subzones, S, may be given as:

$$S = \left\lceil \frac{N_{AVAILABLE}}{N_{SUBZONE-MAX}} \right\rceil, \quad \text{Eq (2)}$$

where "$\lceil \ \rceil$" denotes a ceiling operator that provides the next higher integer value.

Since $N_{AVAILABLE}/N_{SUBZONE,MAX}$ may not be an integer value, a given subzone may include fewer than $N_{SUBZONE,MAX}$ usable hop-ports. The $N_{AVAILABLE}$ usable hop-ports may be allocated as evenly as possible to the S subzones, e.g., with a granularity of one block. A block includes $N_{BLOCK}$ hop-ports and may be the minimum hop-port allocation for a terminal. The following quantities may be computed:

$$S_{SPLIT} = \left(\frac{N_{AVAILABLE}}{N_{BLOCK}}\right) \bmod S, \quad \text{Eq (3)}$$

$$N_{SUBZONE-BIG} = N_{BLOCK} * \left\lceil \frac{N_{AVAILABLE}}{N_{BLOCK} * S} \right\rceil, \text{ and}$$

$$N_{SUBZONE-SMALL} = N_{BLOCK} * \left\lfloor \frac{N_{AVAILABLE}}{N_{BLOCK} * S} \right\rfloor,$$

where "$\lfloor \ \rfloor$" denotes a floor operator that provides the next smaller integer value, and "mod" denotes a modulo operation.

$N_{SUBZONE-BIG}$ is equal to $N_{SUBZONE,MAX}$ and includes $N_{BLOCK}$ more hop-ports than $N_{SUBZONE-SMALL}$. Each of subzones 0 through $S_{SPLIT}-1$ may include $N_{SUBZONE-BIG}$ usable hop-ports, and each of subzones $S_{SPLIT}$ through S-1 may include $N_{SUBZONE-SMALL}$ usable hop-ports. The number of usable hop-ports in subzone s may be denoted as $N_{SUBZONE}(s)$, for $s=0, \ldots, S-1$. As a specific example for the numerology shown in Table 1 with one CDMA subsegment, $N_{AVAILABLE}=352$, $N_{SUBZONE-MAX}=64$, $S=6$, $S_{SPLIT}=4$, $N_{SUBZONE-BIG}=64$, and $N_{SUBZONE-SMALL}=48$. Each of the first four subzones includes 64 usable hop-ports, each of the next two subzones includes 48 usable hop-ports, and the last two subzones include unusable hop-ports.

FIG. 6 shows one design for partitioning the hop-ports into subzones. This design can partition an arbitrary number of usable hop-ports into subzones with a granularity of one block. The usable hop-ports may also be partitioned into subzones in other manners. In general, the usable hop-ports may be partitioned with a hop-port structure having any number of levels, and each level may include any number of units. The units in each level may have equal or approximately equal sizes, as described above, or may have widely varying sizes.

Each hop-port may have an index p that may be decomposed as follows:

$$q = \left\lfloor \frac{p}{N_{FFT}} \right\rfloor, \quad \text{Eq (4)}$$

$$s = \left\lfloor \frac{p \bmod N_{FFT}}{N_{SUBZONE-MAX}} \right\rfloor,$$

$$b = \left\lfloor \frac{p \bmod N_{SUBZONE\text{-}MAX}}{N_{BLOCK}} \right\rfloor, \text{ and}$$

$$r = p \bmod N_{BLOCK},$$

where q is an index of an SDMA subtree in which hop-port p belongs, s is an index of a subzone within SDMA subtree q in which hop-port p belongs, b is an index of a block within subzone s in which hop-port p belongs, and r is an index of a hop-port within block b corresponding to hop-port p.

In the description herein, the phrases "element with index x" and "element x" are used interchangeably. An element may be any quantity.

Hop-port index p may thus be represented with a set of indices (q, s, b, r) and may be expressed as a function of these indices, as follows:

$$p = q^* N_{AVAILABLE} + s^* N_{SUBZONE\text{-}MAX} + b^* N_{BLOCK} + r. \qquad \text{Eq (5)}$$

Hop-port p is usable if the following conditions are true:
1. s<S, and
2. (p mod $N_{SUBZONE,MAX}$)<$N_{SUBZONE}$(s).

On the reverse link, a group of $N_{BLOCK}$ hop-ports (which is also referred to as a hop-port block) may be mapped to a group of $N_{BLOCK}$ contiguous subcarriers (which is also referred to as a subcarrier block). This mapping may remain fixed for the duration of an RL PHY frame. A tile is a block of $N_{BLOCK}$ hop-ports for the duration of one PHY frame.

The system may support frequency hopping on the forward and/or reverse link. With frequency hopping, information may be sent on different subcarriers in different hop intervals. A hop interval may be any duration, e.g., a PHY frame, an OFDM symbol period, multiple OFDM symbol periods, etc. A set of hop-ports may be assigned for transmission and may be mapped to a specific set of subcarriers in a given hop interval based on a mapping function. The sequence of hop-permutations for different hop intervals is referred to as a hopping sequence. The hopping sequence may select different sets of subcarriers in different hop intervals to obtain frequency diversity, randomize interference, and/or other benefits.

In one design, the system may support global hopping (GH) and local hopping (LH) structures for the forward and/or reverse link. GH and LH may also be referred to as global hopping block (GHB) and local hopping block (LHB), respectively. In the GH structure, a hop-port may hop over the entire system bandwidth. In the LH structure, a hop-port may hop within a given subzone. In one design, $N_{GH}$ hop-ports in each SDMA subtree may be allocated for GH, and $N_{LH}$ hop-ports in each SDMA subtree may be allocated for LH, where in general $N_{GH} \geq 0$ and $N_{LH} \geq 0$. The GH hop-ports may hop globally over the entire system bandwidth whereas the LH hop-ports may hop locally within their subzones. Localized hopping may also be constrained to a region of other sizes, e.g., multiple subzones.

In one design of the GH structure, a given GH hop-port (GH, q, s, b, r) may be mapped to a nominally available subcarrier, as follows:

$$f_{AVAIL\text{-}GH} = N_{BLOCK} * H_{GLOBAL,GH}\{b_{MIN}(s) + H_{SECTOR,GH}^{ijqs}(b)\} + r, \qquad \text{Eq (6)}$$

where $H_{SECTOR,GH}^{ijqs}$ is a sector-specific and subzone-specific permutation function for GH, $H_{GLOBAL,GH}^{ij}$ is a global permutation function for GH, $$b_{MIN}(s) = \frac{\sum_{i<s} N_{SUBZONE}(i)}{N_{BLOCK}}$$

is the number of usable hop-port blocks before subzone s, and $f_{AVAIL\text{-}GH}$ is an index of a nominally available subcarrier for the GH hop-port.

Indices q, s, b and r may be determined as shown in equation set (4). In the design shown in equation (6), block index b is provided to permutation function $H_{SECTOR,GH}^{ijqs}$, which maps block b to one of the $N_{SUBZONE}(s)/N_{BLOCK}$ blocks in subzone s. $H_{SECTOR,GH}^{ijqs}$ may be specific for a sector and may be a function of superframe index i, PHY frame index j, subtree index q, and subzone index s. The output of $H_{SECTOR,GH}$ is summed with $b_{MIN}(s)$ to obtain an intermediate index v. Index v is then provided to permutation function $H_{GLOBAL,GH}^{ij}$, which maps block v to one subcarrier block among $N_{AVAILABLE}/N_{BLOCK}$ nominally available subcarrier blocks. $H_{GLOBAL,GH}^{ij}$ may be the same for all sectors and may be a function of superframe index i and PHY frame index j. The GH hop-port is mapped to a nominally available subcarrier whose index is determined by multiplying the output of $H_{GLOBAL,GH}^{ij}$ with $N_{BLOCK}$ and summing the result with r.

As noted above, the C CDMA subsegments may hop across different CDMA hop zones in different CDMA frames. When the CDMA subsegments hop, some subcarriers may be displaced and other subcarriers may be newly freed. The displaced subcarriers are subcarriers actually occupied by the hopped CDMA subsegments and are not among the nominally occupied subcarriers. The newly-freed subcarriers are subcarriers nominally occupied by the CDMA subsegments but not actually occupied because of hopping. If subcarrier $f_{AVAIL\text{-}GH}$ is not a displaced subcarrier, then GH hop-port (GH, q, s, b, r) may be mapped to subcarrier $f_{AVAIL\text{-}GH}$. If subcarrier $f_{AVAIL\text{-}GH}$ is a displaced subcarrier with index k, then GH hop-port (GH, q, s, b, r) may be remapped to a newly-freed subcarrier with index k.

In the GH design shown in equation (6), the $N_{SUBZONE}(s)/N_{BLOCK}$ usable hop-port blocks in each subzone are first permuted locally within the subzone using $H_{SECTOR,GH}^{ijqs}$. The $N_{AVAILABLE}/N_{BLOCK}$ permuted hop-port blocks for all S subzones are then permuted globally and mapped to all nominally available subcarrier blocks using $H_{GLOBAL,GH}^{ij}$. Since $H_{GLOBAL,GH}^{ij}$ is the same across all sectors, the subcarriers allocated to each subzone is the same across all sectors. This may support fractional frequency reuse (FFR) schemes. $H_{SECTOR,GH}^{ijqs}$ is different for different sectors in order to provide interference diversity within each subzone. $H_{SECTOR,GH}^{ijqs}$ and $H_{GLOBAL,GH}^{ij}$ may change every PHY frame, may repeat every 16 superframe, and may be defined based on any permutation generation algorithm known in the art.

Figure 7:
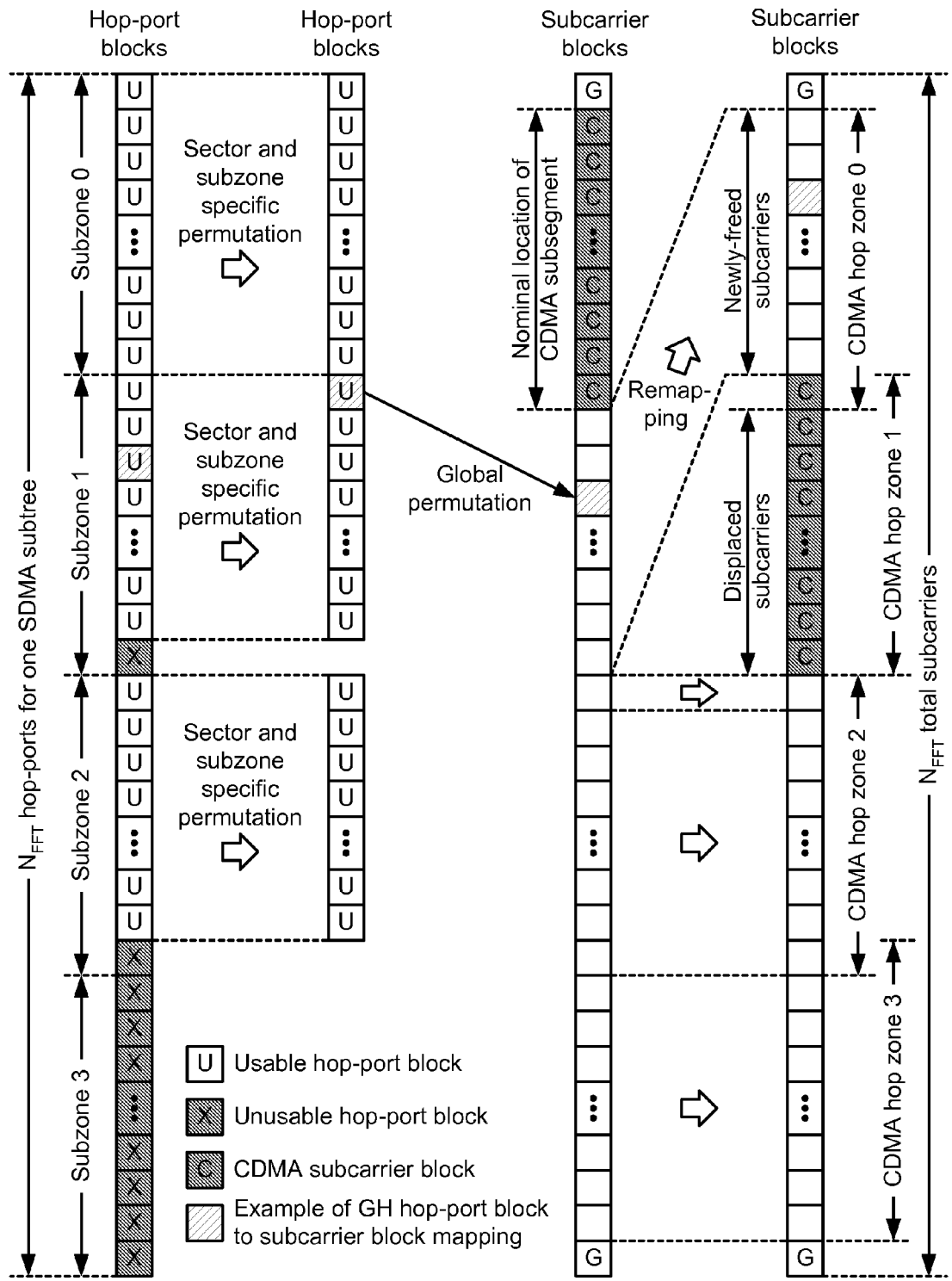
FIG. 7 shows hop-port to subcarrier mapping for a GH structure.

FIG. 7 shows an example of hop-port to subcarrier mapping for the GH structure. In this example, three subzones 0, 1 and 2 are formed with the $N_{AVAILABLE}$ usable hop-ports, each subzone includes 128 hop-ports, and one CDMA subsegment is sent in 128 subcarriers. The hop-port blocks in each subzone may first be permuted with $H_{SECTOR,GH}^{ijqs}$. The permuted hop-port blocks may then be mapped to subcarrier blocks with $H_{GLOBAL,GH}^{ij}$.

In the example shown in FIG. 7, the CDMA subsegment may nominally occupy CDMA hop zone 0 but may hop to CDMA hop zone 1. The displaced subcarriers are subcarriers in CDMA hop zone 1 but not in CDMA hop zone 0. The newly-freed subcarriers are subcarriers in CDMA hop zone 0 but not in CDMA hop zone 1. All hop-ports mapped to the displaced subcarriers may be remapped to the newly-freed subcarriers.

In one design of the LH structure, a given LH hop-port (LH, q, s, b, r) may be mapped to a nominally available subcarrier, as follows:

$$f_{AVAIL-LH} = F_{MIN-LH}(s) + H_{SECTOR,LH}^{ijqs}(b) * N_{BLOCK} + r, \quad \text{Eq (7)}$$

where $H_{SECTOR,LH}^{ijqs}$ is a sector-specific and subzone-specific permutation function for LH, $$f_{MIN-LH}(s) = \sum_{i<s} N_{SUBZONE}(i)$$

is the number of usable hop-ports before subzone s, and $f_{AVAIL-LH}$ is an index of a nominally available subcarrier for the LH hop-port.

Indices q, s, b and r may be determined as shown in equation set (4). In the design shown in equation (7), block index b is provided to permutation function $H_{SECTOR,LH}^{ijqs}$, which maps block b to one of the $N_{SUBZONE}(s)/N_{BLOCK}$ blocks in subzone s. The LH hop-port is mapped to a nominally available subcarrier whose index is determined by multiplying the output of $H_{SECTOR,LH}$ with $N_{BLOCK}$ and summing the result with r and $f_{MIN-LH}(s)$. If subcarrier $f_{AVAIL-LH}$ is not a displaced subcarrier, then LH hop-port (LH, q, s, b, r) may be mapped to subcarrier $f_{AVAIL-LH}$. If subcarrier $f_{AVAIL-LH}$ is a displaced subcarrier with index k, then LH hop-port (LH, q, s, b, r) may be remapped to a newly-freed subcarrier with index k.

In the LH design shown in equation (7), the $N_{SUBZONE}(s)/N_{BLOCK}$ usable hop-port blocks in each subzone are first permuted locally within the subzone using $H_{SECTOR,LH}$. The $N_{SUBZONE}(s)/N_{BLOCK}$ permuted hop-port blocks in each subzone are then mapped to a corresponding set of next $N_{SUBZONE}(s)/N_{BLOCK}$ nominally available subcarrier blocks. $H_{SECTOR,LH}^{ijqs}$ is different for different sectors in order to provide interference diversity within each subzone. The mapping of the permuted hop-port blocks in each subzone to subcarrier blocks is the same across all sectors. $H_{SECTOR,LH}^{ijqs}$ may change every PHY frame, may repeat every 16 superframe, and may be defined based on any permutation generation algorithm known in the art.

Figure 8:
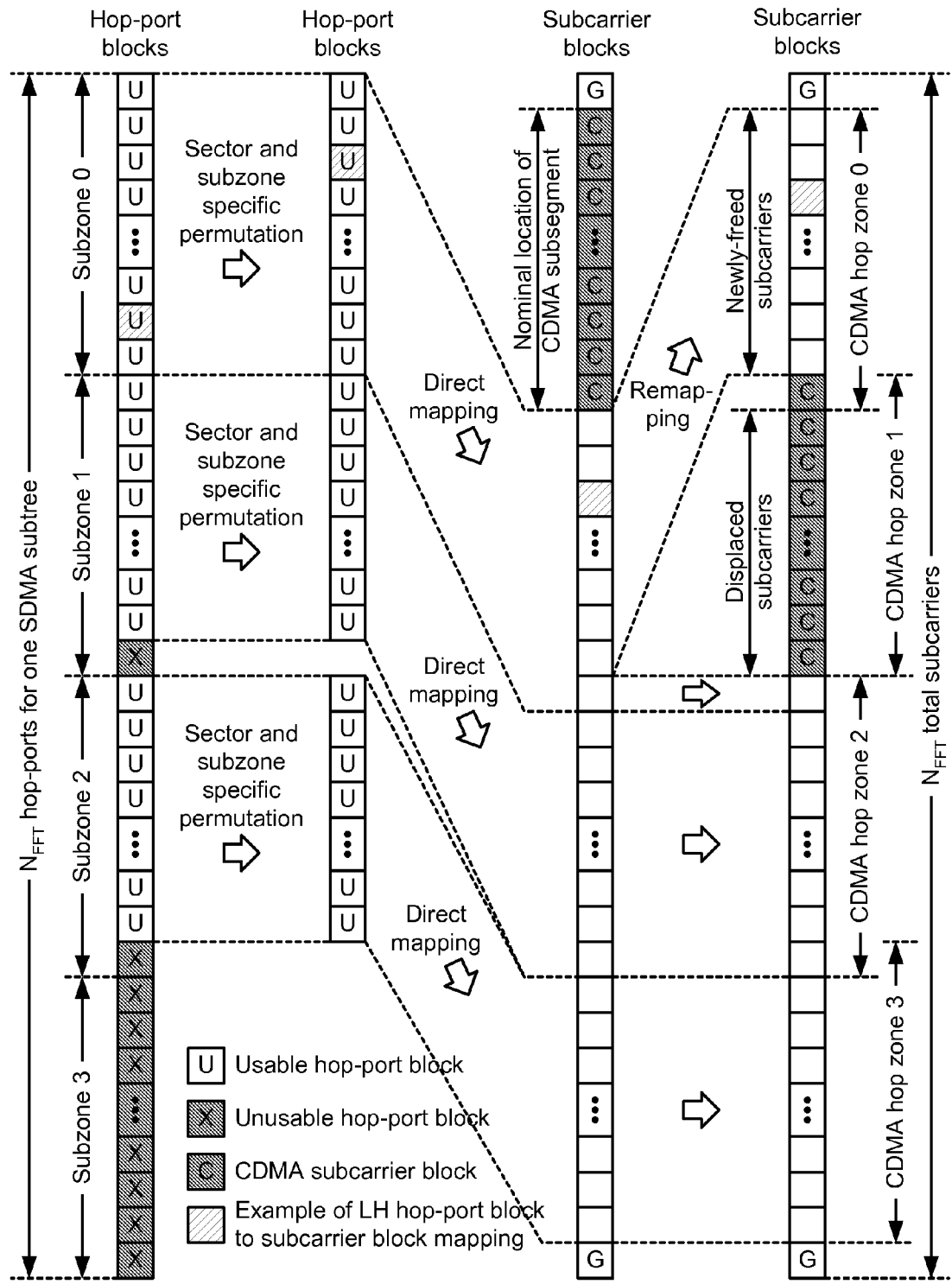
FIG. 8 shows hop-port to subcarrier mapping for a LH structure.

FIG. 8 shows an example of hop-port to subcarrier mapping for the LH structure. In this example, three subzones 0, 1 and 2 are formed with the $N_{AVAILABLE}$ usable hop-ports, each subzone includes 128 hop-ports, and one CDMA subsegment is sent in 128 subcarriers. The hop-port blocks in each subzone may first be permuted with $H_{SECTOR,LH}^{ijqs}$. The permuted hop-port blocks may then be mapped to subcarrier blocks is a predetermined order. The CDMA subsegment may nominally occupy CDMA hop zone 0 but may hop to CDMA hop zone 1. All hop-ports mapped to the displaced subcarriers may be remapped to the newly-freed subcarriers. The hop-ports with a given subzone may be mapped to non-contiguous subcarriers due to the remapping.

In the design described above, each CDMA subsegment may nominally occupy a set of subcarriers but may hop to another set of subcarriers. The usable hop-ports may be remapped from the displaced subcarriers to the newly-freed subcarriers based on a predetermined remapping scheme. In general, the C CDMA subsegments may hop based on a permutation function $H_{CDMA}$, which may be independent of the permutation functions for the usable hop-ports. Whenever a collision occurs between a CDMA subsegment and a usable hop-port, the usable hop-port may be remapped based on a suitable remapping scheme.

The system may employ hybrid automatic repeat request (HARQ) to improve reliability for data transmission. With HARQ, a transmitter may send one or more transmissions for a packet, one transmission at a time. A receiver may receive each transmission sent by the transmitter and may attempt to decode all received transmissions to recover the packet. The receiver may send an acknowledgement (ACK) if the packet is decoded correctly. The transmitter may terminate transmission of the packet upon receiving the ACK.

Multiple (L) interlaces may be defined, with each interlace including PHY frames that are spaced apart by L PHY frames, where L may be equal to 4, 6, 8, etc. All transmissions of a packet may be sent on one interlace, and each transmission may be sent in one PHY frame of that interlace.

The GH and LH structures may be employed in various manners. In one design, either GH or LH may be used for each PHY frame and may be configurable. In another design, both GH and LH may be used for a given PHY frame, e.g., GH may be used for $N_{GB}$ subcarriers and LH may be used for $N_{LB}$ subcarriers. In yet another design, GH may be used for some PHY frames, LH may be used for some other PHY frames, and both GH and LH may be used for yet some other PHY frames.

In another design, either GH or LH may be used for each interlace and may be configurable. In yet another design, both GH and LH may be used for a given interlace. In yet another design, GH may be used for some interlaces, LH may be used for some other interlaces, and both GH and LH may be used for yet some other interlaces.

On the forward link, $N_{FFT}-N_{GUARD}$ subcarriers may be available for transmission, and $N_{FFT}-N_{GUARD}$ hop-ports may be usable for each SDMA subtree. The $N_{FFT}$ hop-ports for each SDMA subtree may be partitioned into $N_{FFT}/N_{SUBZONE,MAX}$ subzones, with each subzone including $N_{SUBZONE,MAX}$ consecutive hop-ports in the SDMA subtree. The subzone size for the forward link may or may not be equal the subzone size for the reverse link. The first S subzones may include the usable hop-ports, where S may be given as:

$$S = \left\lceil \frac{N_{FFT} - N_{GUARD}}{N_{SUBZONE-MAX}} \right\rceil. \quad \text{Eq (8)}$$

The $N_{FFT}-N_{GUARD}$ usable hop-ports may be allocated as evenly as possible to the S subzones, e.g., with a granularity of one block as shown in equation set (3), albeit with $N_{AVAILABLE}$ replaced with $N_{FFT}-N_{GUARD}$. Each of subzones 0 through $S_{SPLIT}-1$ may include $N_{SUBZONE-BIG}$ usable hop-ports, and each of subzones $S_{SPLIT}$ through $S-1$ may include $N_{SUBZONE-SMALL}$ usable hop-ports.

In one design, the system may support BRCH and DRCH structures for the forward and/or reverse link. In the BRCH structure, a set of hop-ports may be mapped to a set of contiguous subcarriers that may vary across frequency over time. The BRCH structure may be used for frequency-selective transmissions. In the DRCH structure, a set of hop-ports may be mapped to a set of subcarriers that may be distributed across all or a large portion of the system bandwidth. The DRCH structure may be used to achieve frequency diversity.

FIG. 9A shows the BRCH structure. Each BRCH user may be assigned a block of $N_{BLOCK}$ contiguous subcarriers for an entire PHY frame. The transmission for each BRCH user may be sent in a specific part of the system bandwidth.

FIG. 9B shows the DRCH structure. Each DRCH user may be assigned $N_{BLOCK}$ subcarriers that may be spaced apart, e.g., by 32 subcarriers as shown in FIG. 9B. The subcarriers for each DRCH user may hop across a PHY frame, e.g., every two OFDM symbol periods as shown in FIG. 9B. The transmission for each DRCH user may be sent across the system bandwidth.

The system may support several multiplexing modes for the BRCH and DRCH structures. In one design, two multiplexing modes 1 and 2 may be supported, and one multiplexing may be selected for use.

FIG. 10A shows a design of multiplexing mode 1. In this design, the DRCH structure punctures the BRCH structure, and a DRCH transmission replaces a BRCH transmission whenever a collision occurs.

FIG. 10B shows a design of multiplexing mode 2. In this design, the DRCH and BRCH structures are used on DRCH and BRCH zones, respectively. The spacing between subcarriers for each DRCH user in the DRCH structure may be dependent on the number of subcarriers in the DRCH zone.

In one design, the S subzones may be arranged into DRCH, BRCH, and reserved zones. The DRCH zone may include the first $N_{DRCH-SUBZONES}$ subzones 0 through $N_{DRCH-SUBZONES}-1$. The reserved zone may include the last $N_{RESERVED-SUBZONES}$ subzones $S-N_{RESERVED-SUBZONES}$ through $S-1$. The BRCH zone may include the remaining subzones. Each subzone in the reserved zone may be mapped to a set of contiguous subcarriers.

In one design of the BRCH structure, a given BRCH hop-port (BRCH, q, s, b, r) may be mapped to a corresponding subcarrier, as follows:

$$f_{AVAIL-BRCH} = N_{GUARD-LEFT} + N_{OFFSET-BRCH}(s) + H_{SECTOR}^{ijs}(b) * N_{BLOCK} + r, \quad \text{Eq (9)}$$

where $H_{SECTOR}^{ijs}$ is a sector-specific and subzone-specific permutation function for BRCH, $N_{OFFSET-BRCH}(s)$ is the number of hop-ports before subzone s, and $f_{AVAIL-BRCH}$ is an index of a subcarrier for the BRCH hop-port.

Indices q, s, b and r may be determined as shown in equation set (4). In the design shown in equation (9), block index b is provided to permutation function $H_{SECTOR}^{ijs}$, which maps block b to one of the $N_{SUBZONE}(s)/N_{BLOCK}$ blocks in subzone s. The BRCH hop-port is then mapped to a subcarrier whose index is determined by multiplying the output of $H_{SECTOR}^{ijs}$ with $N_{BLOCK}$ and summing the result with r, $N_{OFFSET-BRCH}(s)$ and $N_{GUARD-LEFT}$. $N_{OFFSET-BRCH}(s)$ may be computed in different manners for multiplexing modes 1 and 2. BRCH hop-port (BRCH, q, s, b, r) is usable and mapped to subcarrier $f_{AVAIL-BRCH}$ if this subcarrier is not used by a reserved hop-port. Otherwise, BRCH hop-port (BRCH, q, s, b, r) is not usable.

In the BRCH design shown in equation (9), the $N_{SUBZONE}(s)/N_{BLOCK}$ usable hop-port blocks in each BRCH subzone are first permuted locally within the subzone using $H_{SECTOR}^{ijs}$. The $N_{SUBZONE}(s)/N_{BLOCK}$ permuted hop-port blocks in each subzone are then mapped to a corresponding set of $N_{SUBZONE}(s)/N_{BLOCK}$ subcarrier blocks for the subzone. $H_{SECTOR}^{ijs}$ is different for different sectors in order to provide interference diversity within each subzone. $H_{SECTOR}^{ijs}$ may change every PHY frame, may repeat every 16 superframe, and may be defined based on any permutation generation algorithm known in the art.

Figure 11:
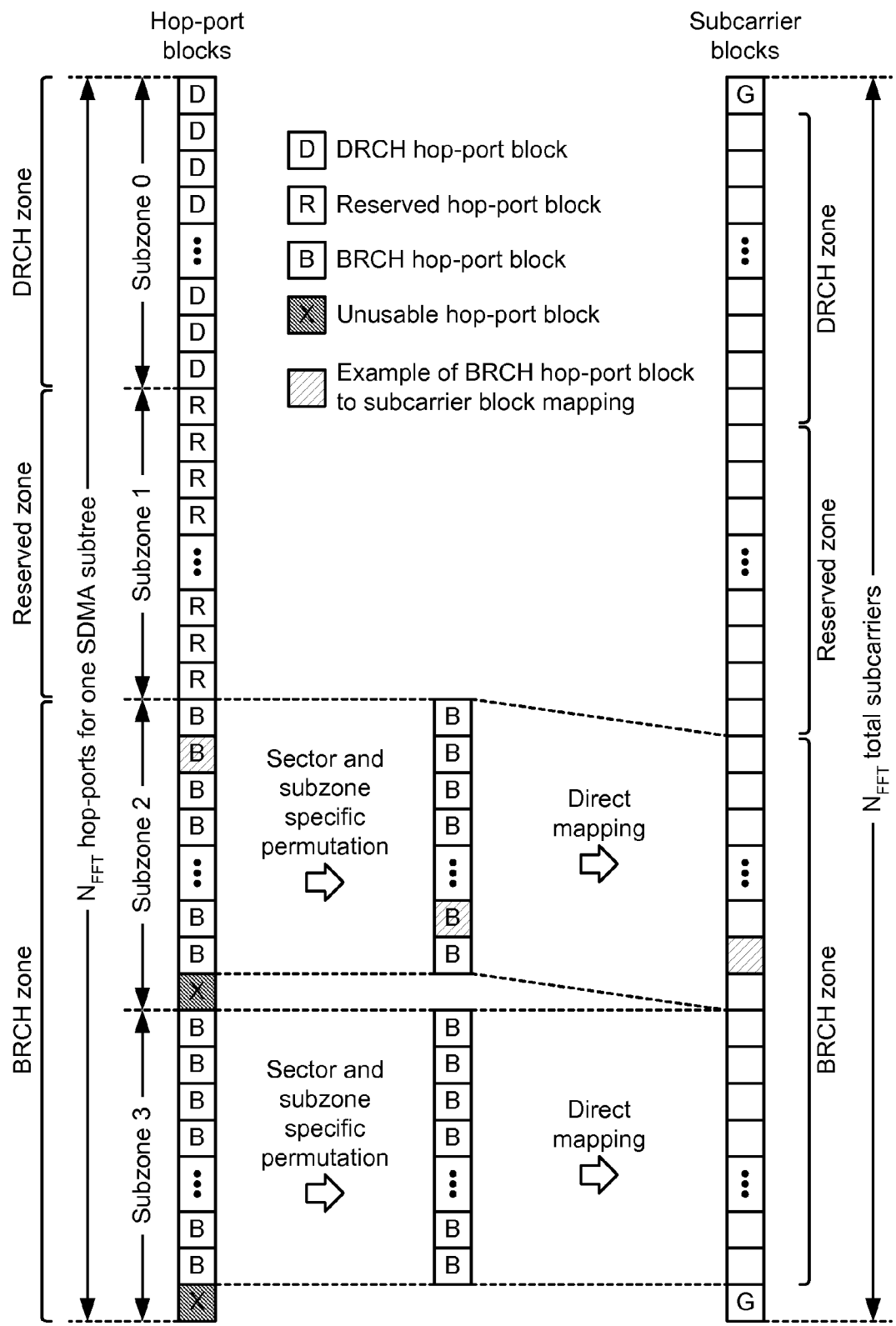
FIG. 11 shows hop-port to subcarrier mapping for the BRCH structure.

FIG. 11 shows an example of hop-port to subcarrier mapping for the BRCH structure. In this example, four subzones 0 through 3 are formed, subzone 0 is used for DRCH, subzone 1 is reserved, and subzones 2 and 3 are used for BRCH. The hop-port blocks in each BRCH subzone may first be permuted with $H_{SECTOR}^{ijs}$. The permuted hop-port blocks in each BRCH subzone may then be mapped to the corresponding set of subcarrier blocks for the BRCH subzone.

In one design of the DRCH structure, a given DRCH hop-port (DRCH, q, s, b, r) may be mapped to a corresponding subcarrier, as follows:

$$f_{AVAIL-DRCH} = \{N_{OFFSET-DRCH}(s,b) + N_{DRCH-BLOCKS} * r\} \bmod N_{DRCH-AVAIL}, \quad \text{Eq (10)}$$

where $N_{DRCH-AVAIL}$ is the number of subcarriers available for DRCH, $N_{DRCH-BLOCKS} = N_{DRCH-AVAIL}/N_{BLOCK}$ is the number of available subcarrier blocks, $N_{OFFSET-DRCH}(s, b)$ is an offset for block b in subzone s, and $f_{AVAIL-BRCH}$ is an index of a subcarrier for the DRCH hop-port.

The offset $N_{OFFSET-DRCH}(s, b)$ may be given as:

$$N_{OFFSET-DRCH}(s, b) = \text{ZoneOffset}_{DRCH} + N_{MIN-DRCH-SPACING} * \text{RefPos}_{DRCH} + \min(\text{RefPos}_{DRCH}, N_{MAX-DRCH-SPACING}), \quad \text{Eq (11)}$$

where $\text{ZoneOffset}_{DRCH}$ is a pseudo-random offset for the entire DRCH zone, $\text{RefPos}_{DRCH}$ is an offset that is dependent on a subzone-specific and sector-specific offset $\text{InnerOffset}_{DRCH}$, $N_{MIN-DRCH-SPACING}$ is the minimum spacing between DRCH subcarriers, and $N_{MAX-DRCH-SPACING}$ is the maximum spacing between DRCH subcarrier.

Indices q, s, b and r may be determined as shown in equation set (4). In the design shown in equations (10) and (11), block index b and subzone index s are used to compute a pseudo-random offset $N_{OFFSET-DRCH}(s, b)$. The DRCH hop-port is mapped to a subcarrier whose index is determined by multiplying $N_{DRCH-BLOCKS}$ with r, summing the result with $N_{OFFSET-DRCH}(s, b)$, and constraining to the $N_{DRCH-AVAIL}$ available subcarriers for DRCH.

Figure 12A:
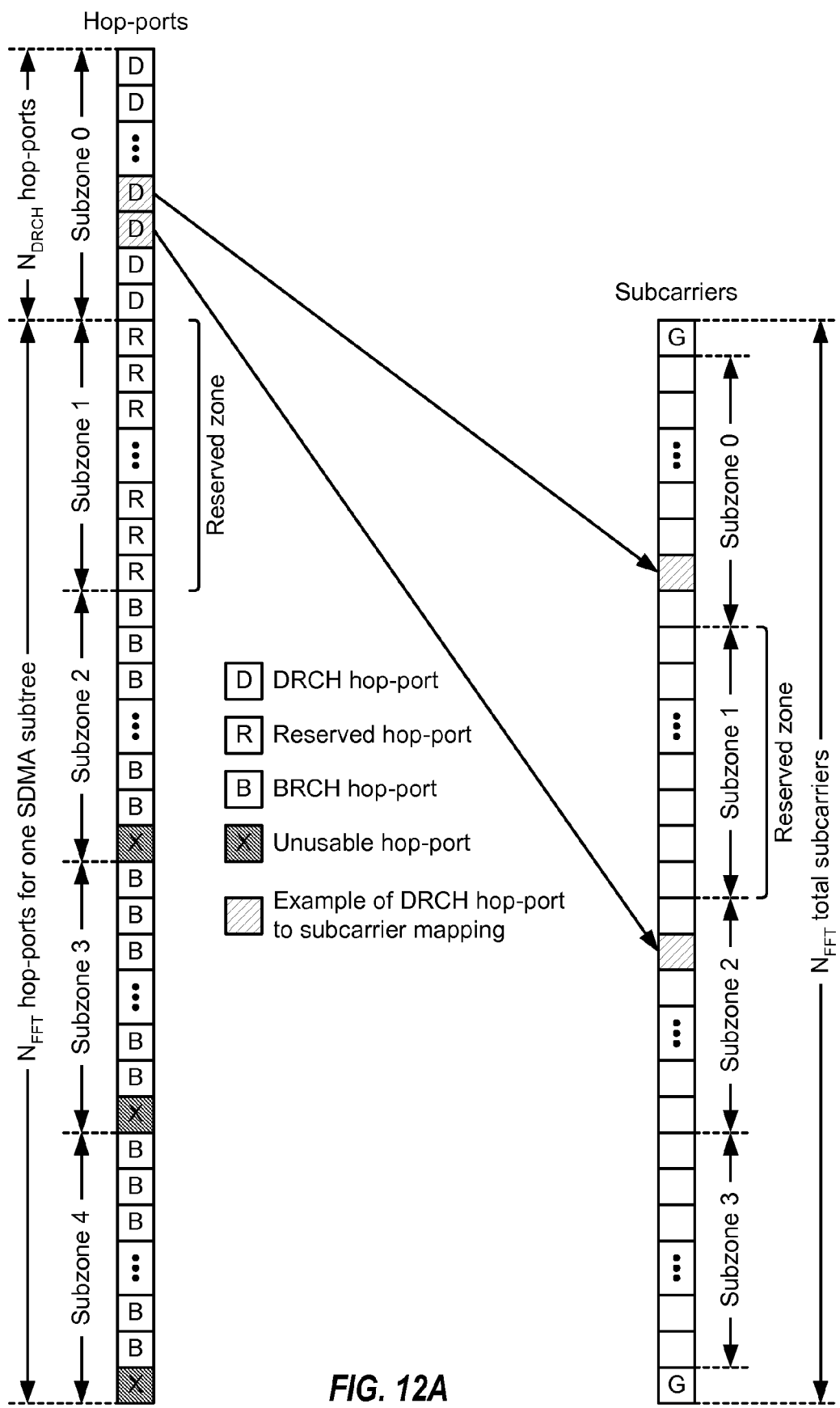
FIGS. 12A and 12B show hop-port to subcarrier mapping for the DRCH structure for multiplexing modes 1 and 2, respectively.

FIG. 12A shows an example of hop-port to subcarrier mapping for the DRCH structure for multiplexing mode 1. In this example, four subzones 1 through 4 are formed with the $N_{FFT}$ hop-ports in on SDMA subtree, subzone 0 includes $N_{DRCH}$ additional hop-ports for DRCH, subzone 1 is reserved, and subzones 2 to 4 are used for BRCH. The hop-ports in each block in the DRCH subzone may be mapped to evenly spaced subcarriers across the system bandwidth but avoiding the set of subcarriers for the reserved subzone.

Figure 12B:
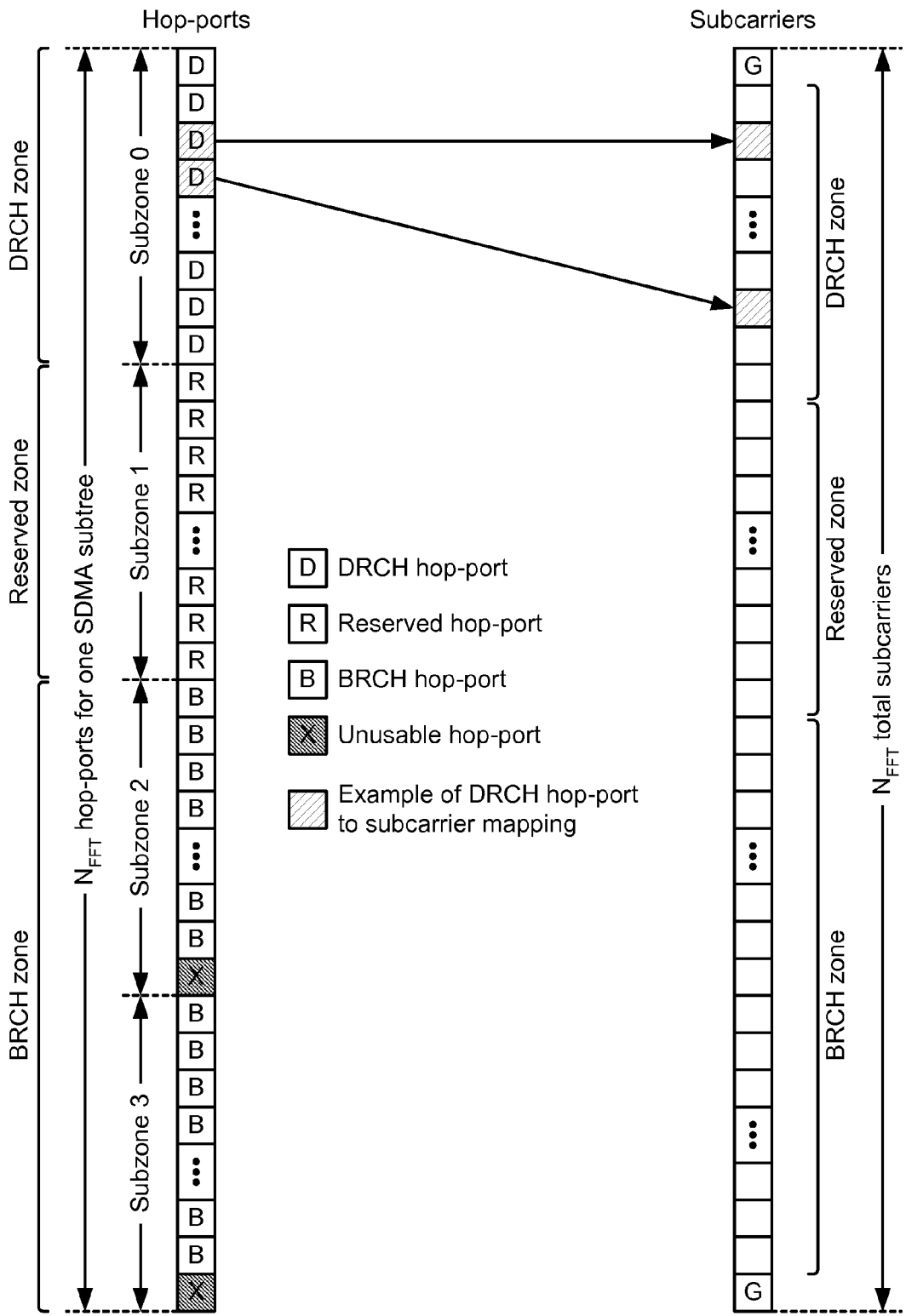

FIG. 12B shows an example of hop-port to subcarrier mapping for the DRCH structure for multiplexing mode 2. In this example, four subzones 0 through 3 are formed with the $N_{FFT}$ hop-ports in on SDMA subtree, subzone 0 is used for DRCH, subzone 1 is reserved, and subzones 2 and 3 are used for BRCH. The hop-ports in each block in the DRCH subzone may be mapped to evenly spaced subcarriers within the DRCH zone.

A set of $N_{FLCS-BLOCKS}$ hop-port blocks may be allocated to a forward link control segment (FLCS) in each forward link PHY Frame. The FLCS may carry control information on the forward link. The hop-port blocks for the FLCS may be located within the DRCH zone if a UseDRCHForFLCS field is set to '1' or located within the BRCH zone otherwise. The allocated hop-port blocks for the FLCS may be exchanged with other hop-port blocks, which may be mapped to subcarrier blocks based on the BRCH or DRCH structure. The FLCS may then occupy the subcarrier blocks to which the exchanged hop-port blocks are mapped.

The following procedure may be used to enumerate all usable hop-port blocks within a zone where the FLCS is allocated.

1. Initialize a hop-port block counter b to 0.
   Initialize a counter k of usable hop-port blocks to 0.
2. If hop-port block b in SDMA subtree 0 is comprised of only usable hop-ports and one of the following conditions holds:
   a. UseDRCHForFLCS field equals '1' and b is part of the DRCH zone;
   b. UseDRCHForFLCS field equals '0' and b is part of the BRCH zone;
   then set FLCSUsableBlock[k]=b and increment k by 1.
3. Increment b by 1.
4. Repeat steps (2) and (3) until one of the following conditions hold:
   a. UseDRCHForFLCS field equals '1' and DRCH hop-port blocks are exhausted.
   b. UseDRCHForFLCS field equals '0' and BRCH hop-port blocks are exhausted.
5. Set TotalNumBlocks=k.

Hop-port blocks may be allocated to the FLCS as follows:
1. Initialize a tile counter k of FLCS hop-port blocks to 0.
   Initialize a subzone counter s to 0.
   Initialize S counters $b_0, b_1, \ldots, b_{s-1}$ of hop-port blocks within the S subzones to 0.
2. If $b_s < N_{SUBZONE}(s)/N_{BLOCK}$ and one of the following conditions holds:
   a. UseDRCHForFLCS field equals '1', subzone s is part of the DRCH zone, and $b_s$ is a usable hop-port block within this subzone;
   b. UseDRCHForFLCS field equals '0', subzone s is part of the BRCH zone, and $b_s$ is a usable hop-port block within this subzone;
   then
   a. define the k-th hop-port block FLCSHopPortBlock[k] of the FLCS to be a block of $N_{BLOCK}$ consecutive hop-ports (BRCH, 0, s, $b_s$, 0) through (BRCH, 0, s, $b_s$, $N_{BLOCK}-1$) if UseDRCHForFLCS field equals '0' and to a block of $N_{BLOCK}$ consecutive hop-ports (DRCH, 0, s, $b_s$, 0) through (DRCH, 0, s, $b_s$, $N_{BLOCK}-1$) if UseDRCHForFLCS field equals '1'.
   b. increment $b_s$ by 1.
   c. Increment k by 1.
3. Set s to (s+1) mod S.
4. If $k < N_{FLCS-BLOCKS}$ then repeat steps (2) and (3).

The $N_{FLCS-BLOCKS}$ hop-port blocks allocated for the FLCS may be exchanged with other hop-port blocks in order to improve diversity. The association of the exchanged hop-port blocks to the allocated hop-port blocks for the FLCS may be defined as follows. The set of usable hop-port blocks may be divided into three control hopping zones of approximately equal sizes $M_0$, $M_1$ and $M_2$, where $M_0 = \lceil \text{TotalNumBlocks}/3 \rceil$, $M_1 = \lceil \text{TotalNumBlocks}/3 \rceil$ if TotalNumBlocks mod 3=2 and $M_1 = \lfloor \text{TotalNumBlocks}/3 \rfloor$ otherwise, and $M_2 = \lfloor \text{TotalNumBlocks}/3 \rfloor$.

Intra-zone permutations $H_0^{ij}$, $H_1^{ij}$, and $H_2^{ij}$ of sizes $M_0$, $M_1$ and $M_2$ corresponding to forward link PHY frame j of superframe i may be defined as follows:

1. Set $SEED_k = f_{PHY-HASH}(15 \times 2^{10} \times 32 \times 4 + \text{PilotID} \times 32 \times 4 + (i \bmod 32) \times 4 + k)$, where PilotID is an ID of a sector and $f_{PHY-HASH}$ is a hash function.
2. $H_k^i$ is a permutation of size $M_k$ generated with seed $SEED_k$ using a permutation generation algorithm, with $0 \leq k < 3$. $H_k^i$ is independent of the forward link PHY frame index and is therefore constant over a superframe.
3. $H_k^{ij}$ as a m-th order cyclic shift of permutation $H_k^i$:

$H_k^{ij}(n) = H_k^i((n+m) \bmod M_k)$, for $0 \leq n < M_k$, where $m = (f_{PHY-HASH}(\text{PilotID}+j+1)) \bmod M_k$.

The association of the exchanged hop-port blocks to the allocated hop-port blocks for the FLCS in forward link PHY frame j of superframe i may be performed according to the following procedure.

1. Initialize a counter k of FLCS hop-port blocks to 0.
   Initialize a counter m of exchanged hop-ports to 0.
   Initialize three counters $c_0$, $c_1$ and $c_2$ of usable hop-port blocks within the three control hopping zones to 0.
2. Set d=m mod 3.
3. If $c_d < M_d$ then:
   a. Set exchanged hop-port block ExchHop-portBlockij[k] associated with the k-th hop-port block FLCSHop-portBlock[k] of the FLCS to be the $(D + H_d^{ij}(c_d))$-th usable hop-port block FLCSUsableBlock[$D + H_d^{ij}(c_d)$], where D=0 if d=0, D=$M_0$ if d=1, and D=($M_0 + M_1$) if d=2.
   b. Increment $c_d$ by 1;
   c. Increment m by 1;
   d. Increment k by 1;
   e. Proceed to 4;
   otherwise
   a. Increment m by 1;
   b. Repeat 2 and 3.
4. If $k < N_{FLCS-BLOCKS}$ then repeat 2 and 3.

When the k-th hop-port block FLCSHopPortBlock[k] of the FLCS is exchanged with the ExchHopPortBlockij[k] hop-port block in forward link PHY frame j of superframe i, the subcarrier block corresponding to hop-port block FLCSHopPortBlock[k] may be mapped by hop-port block ExchHopPortBlockij[k] while the subcarrier block corresponding to hop-port block ExchHopPortBlockij[k] may be mapped by hop-port block FLCSHopPortBlock[k]. Specifically let $p_0$, $p_1, \ldots, p_{NBLOCK-1}$ be a set of contiguous hop-ports within hop-port block FLCSHopPortBlock[k] and let $p'_0, p'_1, \ldots, p'_{NBLOCK-1}$ be a set of contiguous hop-ports within hop-port block ExchHopPortBlockij[k]. In OFDM symbol t of forward link PHY frame j in superframe i, the m-th hop-port within hop-port block FLCSHopPortBlock[k] may be mapped to the subcarrier mapped by hop-port $p'_m$ according to the mapping algorithm for the BRCH or DRCH hop-ports, for $0 \leq m < N_{BLOCK}$. Similarly, the m-th hop-port within hop-port block ExchHopPortBlockij[k] may be mapped to the subcarrier mapped by hop-port $p_m$ according to the mapping algorithm for BRCH or DRCH hop-ports, for $0 \leq m < N_{BLOCK}$.

The allocation of hop-port blocks to the FLCS is static whereas the allocation of the associated exchanged hop-port blocks depends on the forward link PHY frame index and the superframe index and is also sector specific.

Figure 13:
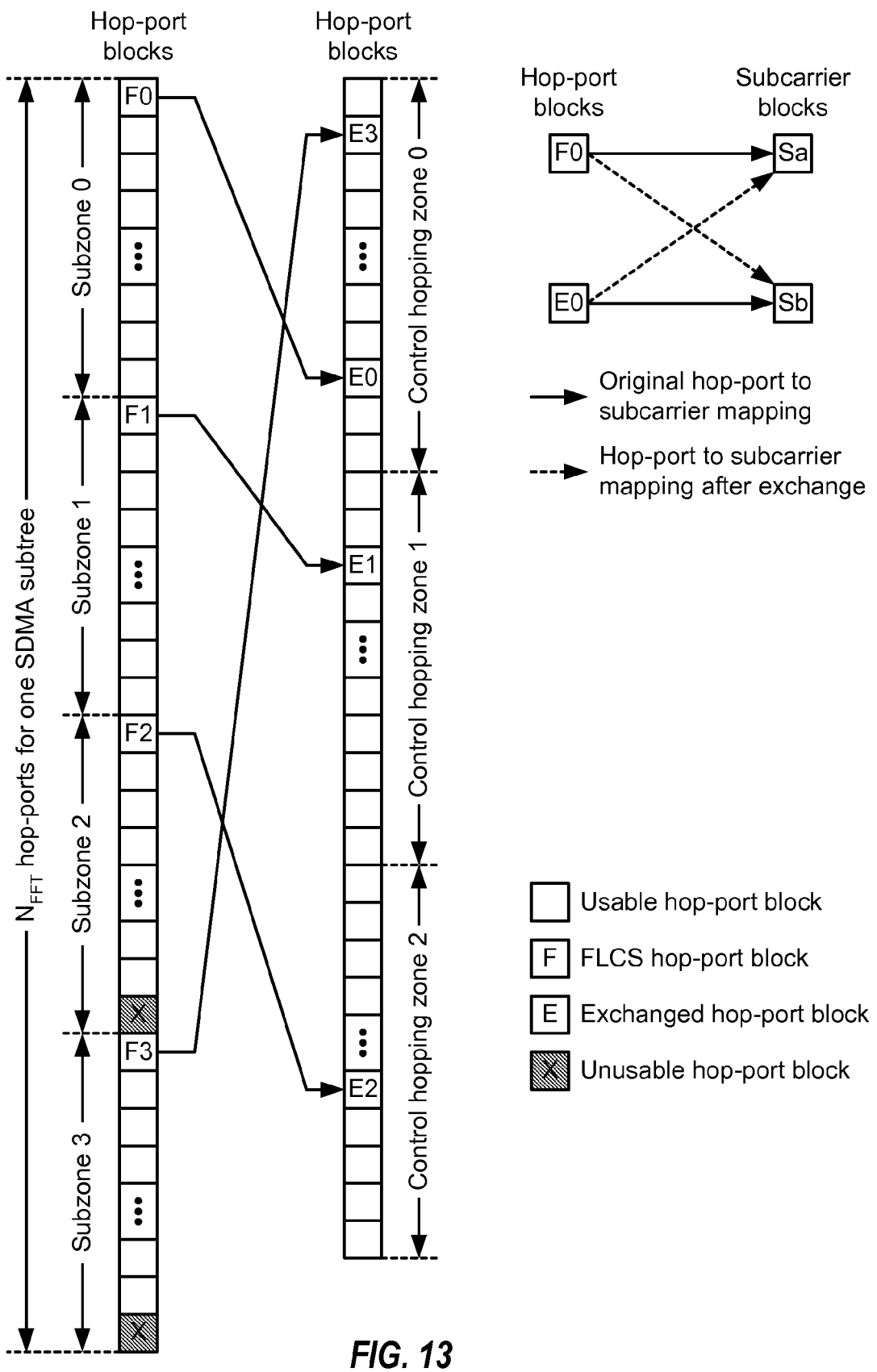
FIG. 13 shows hop-port exchanging for a forward link control segment (FLCS).

FIG. 13 shows an example of hop-port exchange for the FLCS. In this example, four subzones 0 through 3 are formed with the $N_{FFT}$ hop-ports in on SDMA subtree, and the FLCS is allocated four hop-port blocks F0 through F3, which may be the first hop-port block in subzones 0 through 3, respectively. Three control hopping zone 0, 1 and 2 may be defined, with each control hopping zone including about ⅓ of the usable hop-port blocks. Hop-port block F0 may be associated with an exchanged hop-port block E0 in control hopping zone 0, hop-port block F1 may be associated with an exchanged hop-port block E1 in control hopping zone 1, hop-port block F2 may be associated with an exchanged hop-port block E2 in control hopping zone 2, and hop-port block F3 may be associated with an exchanged hop-port block E3 in control hopping zone 0. The exchanged hop-port blocks may be selected in a pseudo-random manner.

Hop-port block F0 may be mapped to subcarrier block Sa, and hop-port block E0 may be mapped to subcarrier block Sb. The FLCS may occupy subcarrier block Sb to which the exchanged hop-port block E0 is mapped, instead of subcarrier block Sa to which the allocated hop-port block F0 is mapped. The mapping of the other hop-port blocks to subcarrier blocks may occur in similar manner.

Equations (6) through (11) show some designs for mapping hop-ports to subcarriers. The mapping of hop-ports to subcarriers may also be performed in other manners using other functions, permutations, combinations of permutations, parameters, etc.

The global and sector-specific permutation functions described above may be generated in various manners. In one design, a permutation function $H^{ab\cdots d}$ may be generated by first deriving a seed based on a function of all parameters for the permutation function, as follows:

$$\text{SEED}=f_{HASH}(a,b,\ldots,d), \quad \text{Eq (12)}$$

where $f_{HASH}(a, b, \ldots, d)$ may be a hash function of a value obtained with all of the input parameters a, b, . . . , d. Permutation $H^{ab\cdots d}$ may then be generated with the SEED and for a particular size using any permutation generation algorithm known in the art.

FIG. 14 shows a design of a process 1400 for mapping hop-ports to subcarriers. A plurality of hop-ports may be partitioned into multiple subzones, with each subzone including a configurable number of hop-ports (block 1412). The hop-ports within each subzone may be permuted based on a permutation function, which may be different for each subzone and each sector (block 1414).

After permutation, the plurality of hop-ports in the multiple subzones may be mapped to a plurality of subcarriers (block 1416). For the LH and BRCH structures, a block of hop-ports in a subzone may be mapped to a designated block of contiguous subcarriers among the plurality of subcarriers. For the GH structure, a block of hop-ports in a subzone may be mapped to a block of contiguous subcarriers among the plurality of subcarriers based on a second permutation function, which may be common for all subzones and all sectors. For the DRCH structure, a block of hop-ports in a subzone may be mapped to a set of subcarriers distributed across the plurality of subcarriers.

The mapping of hop-ports to subcarriers may be performed for only usable hop-ports in the multiple subzones and may avoid a group of reserved subcarriers, if any. At least one hop-port may be mapped to at least one subcarrier occupied by a control segment (e.g., a CDMA subsegment) and may be remapped to at least one subcarrier assigned to the control segment.

FIG. 15 shows a design of an apparatus 1500 for mapping hop-ports to subcarriers. Apparatus 1500 includes means for partitioning a plurality of hop-ports into multiple subzones, with each subzone including a configurable number of hop-ports (module 1512), means for permuting the hop-ports within each subzone based on a permutation function (module 1514), and means for mapping the plurality of hop-ports in the multiple subzones, after permutation, to a plurality of subcarriers (module 1516).

FIG. 16 shows a design of a process 1600 for hopping with remapping. A set of hop-ports may be mapped to a set of subcarriers based on at least one permutation function (block 1612). The set of hop-ports may be a block of hop-ports, a subzone of hop-ports, etc. At least one hop-port mapped to at least one unavailable subcarrier may be identified (block 1614) and may be remapped to at least one available subcarrier outside the set of subcarriers (block 1616).

For blocks 1614 and 1616, a first group of subcarriers assigned to a control segment (e.g., a CDMA subsegment) and a second group of subcarriers occupied by the control segment may be determined. The control segment may hop from the first group to the second group, and each group may include contiguous subcarriers. The subcarriers in the second group may be unavailable, and the at least one unavailable subcarrier may be among those in the second group. The subcarriers in the first group but not in the second group may be available for remapping by hop-ports, and the at least one available subcarrier may be among these subcarriers.

FIG. 17 shows a design of an apparatus 1700 for hopping with remapping. Apparatus 1700 includes means for mapping a set of hop-ports to a set of subcarriers based on at least one permutation function (module 1712), means for identifying at least one hop-port mapped to at least one unavailable subcarrier (module 1714), and means for remapping the at least one hop-port to at least one available subcarrier outside the set of subcarriers (module 1716).

Figure 18:
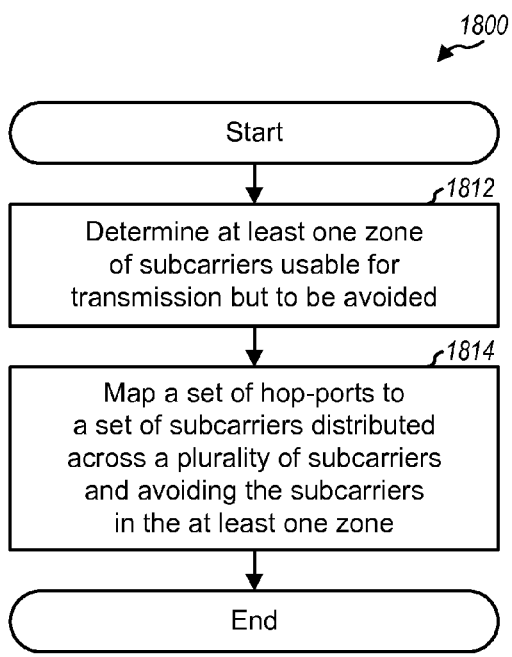
FIG. 18 shows a process for distributed hopping.

FIG. 18 shows a design of a process 1800 for distributed hopping while avoiding certain subcarriers. At least one zone of subcarriers usable for transmission but to be avoided may be determined (block 1812). The at least one zone may include a zone of reserved subcarriers for a control segment, a zone of subcarriers for BRCH, etc. A set of hop-ports may be mapped to a set of subcarriers distributed across a plurality of subcarriers and avoiding the subcarriers in the at least one zone (block 1814). The subcarriers in the set may be evenly spaced across the plurality of subcarriers. The plurality of subcarriers may span the entire system bandwidth, and the at least one zone may include contiguous subcarriers located away from the left and right edges of the system bandwidth, e.g., as shown in FIG. 12A. The plurality of subcarriers may also span a portion of the system bandwidth, and the at least one zone of subcarriers may span the remaining portion of the system bandwidth, e.g., as shown in FIG. 12B.

Figure 19:
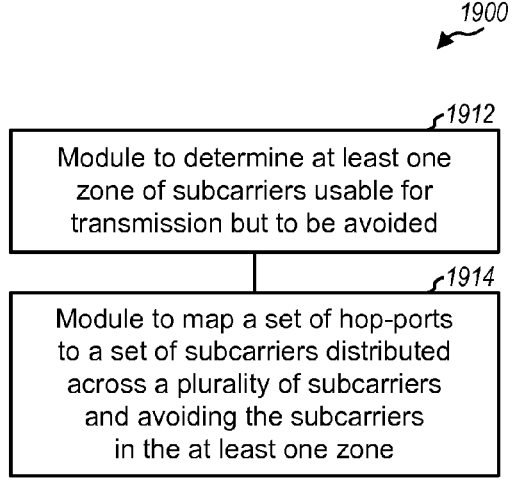
FIG. 19 shows an apparatus for distributed hopping.

FIG. 19 shows a design of an apparatus 1900 for distributed hopping while avoiding certain subcarriers. Apparatus 1900 includes means for determining at least one zone of subcarriers usable for transmission but to be avoided (module 1912), and means for mapping a set of hop-ports to a set of subcarriers distributed across a plurality of subcarriers and avoiding the subcarriers in the at least one zone (module 1914).

FIG. 20 shows a design of a process 2000 for hopping with exchanged hop-ports. A first hop-port assigned to a control segment (e.g., the FLCS) may be determined (block 2012). A second hop-port to exchange with the first hop-port may be determined (block 2014). The first hop-port may be mapped to a first subcarrier (block 2016), and the second hop-port may be mapped to a second subcarrier (block 2018). The second subcarrier may be assigned to the control segment (block 2020), and the first subcarrier may be assigned to a transmission assigned with the second hop-port (block 2022).

The exchanging of hop-ports and mapping to subcarriers may be performed for any number of hop-ports assigned to the control segment. In one design, a first set of hop-ports assigned to the control segment and distributed across a configurable number of subzones may be determined. A second set of hop-ports to exchange with the first set of hop-ports and distributed across a fixed number of hopping zones may be determined. The first set of hop-ports may be mapped to a first set of subcarriers, and the second set of hop-ports may be mapped to a second set of subcarriers. The second set of subcarriers may be assigned to the control segment, and the first set of subcarriers may be assigned to one or more transmissions assigned with the second set of hop-ports.

FIG. 21 shows a design of an apparatus 2100 for hopping with exchanged hop-ports. Apparatus 2100 includes means for determining a first hop-port assigned to a control segment (module 2112), means for determining a second hop-port to exchange with the first hop-port (module 2114), means for mapping the first hop-port to a first subcarrier (module 2116), means for mapping the second hop-port to a second subcarrier (module 2118), means for assigning the second subcarrier to the control segment (module 2120), and means for assigning the first subcarrier to a transmission assigned with the second hop-port (module 2122).

FIG. 22 shows a design of a process 2200 for performing local and global hopping. Local hopping (e.g., LH or BRCH) may be performed in a first time interval (block 2212). Global hopping (e.g., GH or DRCH) may be performed in a second time interval (block 2214). In one design, a block of hop-ports may be mapped to a block of subcarriers within a subzone for local hopping, and a block of hop-ports may be mapped to a block of subcarriers anywhere within the system bandwidth for global hopping. In another design, a block of hop-ports may be mapped to a block of contiguous subcarriers within a subzone for local hopping, and a block of hop-ports may be mapped to a set of subcarriers distributed across a plurality of subcarriers for global hopping.

Local and global hopping may be performed in different time intervals, e.g., the first time interval may be for a first interlace, and the second time interval may be for a second interlace for HARQ. Local and global hopping may also be performed in the same time interval, e.g., local hopping may be performed for a first group of subcarriers, and global hopping may be performed for a second group of subcarriers.

FIG. 23 shows a design of an apparatus 2300 for performing local and global hopping. Apparatus 2300 includes means for performing local hopping in a first time interval (module 2312), and means for performing global hopping in a second time interval (module 2314).

The modules in FIGS. 15, 17, 19, 21 and 23 may comprise processors, electronics devices, hardware devices, electronics components, logical circuits, memories, etc., or any combination thereof.

Figure 24:
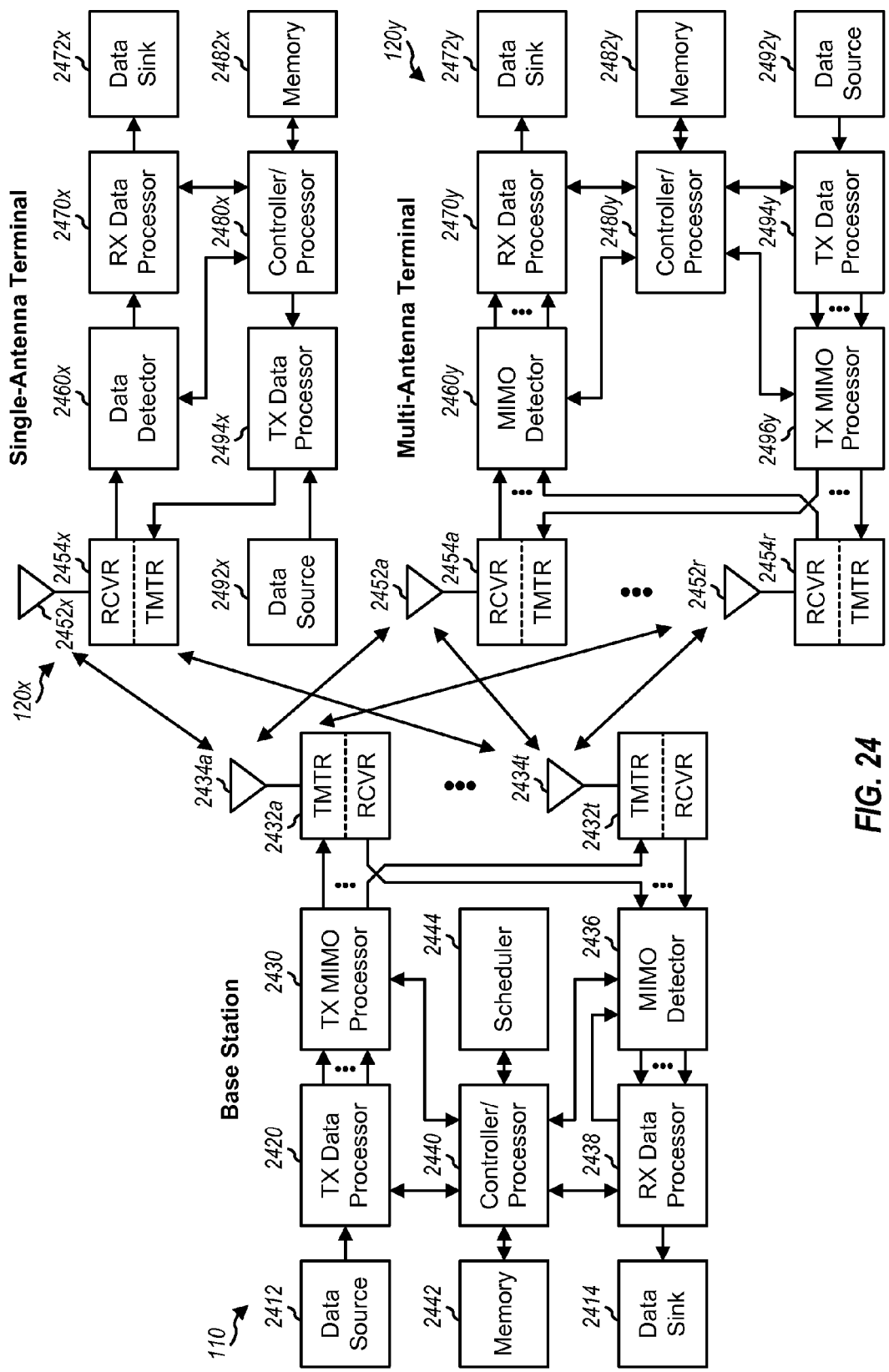
FIG. 24 shows a block diagram of one base station and two terminals.

FIG. 24 shows a block diagram of one base station 110 and two terminals 120x and 120y in system 100. Base station 110 is equipped with multiple (T) antennas 2434a through 2434t. Terminal 120x is equipped with a single antenna 2452x. Terminal 120y is equipped with multiple (R) antennas 2452a through 2452r. Each antenna may be a physical antenna or an antenna array.

At base station 110, a transmit (TX) data processor 2420 may receive traffic data from a data source 2412 for one or more terminals scheduled for data transmission. Processor 2420 may process (e.g., encode, interleave, and symbol map) the traffic data and generate data symbols. Processor 2420 may also generate and multiplex signaling and pilot symbols with the data symbols. A TX MIMO processor 2430 may perform transmitter spatial processing (e.g., direct MIMO mapping, precoding, beamforming, etc.) on the data, signaling and pilot symbols. Multiple data symbols may be sent in parallel on a single subcarrier via the T antennas. Processor 2430 may provide T output symbol streams to T transmitters (TMTRs) 2432a through 2432t. Each transmitter 2432 may perform modulation (e.g., for OFDM) on its output symbols to obtain output chips. Each transmitter 2432 may further process (e.g., convert to analog, filter, amplify, and upconvert) its output chips and generate a forward link signal. T forward link signals from transmitters 2432a through 2432t may be transmitted via T antennas 2434a through 2434t, respectively.

At each terminal 120, one or multiple antennas 2452 may receive the forward link signals from base station 110. Each antenna 2452 may provide a received signal to a respective receiver (RCVR) 2454. Each receiver 2454 may process (e.g., filter, amplify, downconvert, and digitize) its received signal to obtain samples. Each receiver 2454 may also perform demodulation (e.g., for OFDM) on the samples to obtain received symbols.

At single-antenna terminal 120x, a data detector 2460x may perform data detection (e.g., matched filtering or equalization) on the received symbols and provide data symbol estimates. A receive (RX) data processor 2470x may process (e.g., symbol demap, deinterleave, and decode) the data symbol estimates and provide decoded data to a data sink 2472x. At multi-antenna terminal 120y, a MIMO detector 2460y may perform MIMO detection on the received symbols and provide data symbol estimates. An RX data processor 2470y may process the data symbol estimates and provide decoded data to a data sink 2472y.

Terminals 120x and 120y may transmit traffic data and/or control information on the reverse link to base station 110. At each terminal 120, traffic data from a data source 2492 and control information from a controller/processor 2480 may be processed by a TX data processor 2494, further processed by a TX MIMO processor 2496 (if applicable), conditioned by one or more transmitters 2454, and transmitted via one or more antennas 2452. At base station 110, the reverse link signals from terminals 120x and 120y may be received by antennas 2434a through 2434t, processed by receivers 2432a through 2432t, and further processed by a MIMO detector 2436 and an RX data processor 2438 to recover the traffic data and control information sent by the terminals.

Controllers/processors 2440, 2480x and 2480y may control the operation at base station 110 and terminals 120x and 120y, respectively. Processors 2440, 2480x and 2480y may each implement process 1400 in FIG. 14, process 1600 in FIG. 16, process 1800 in FIG. 18, process 2000 in FIG. 20, process 2200 in FIG. 22, and/or other process for the techniques described herein. A scheduler 2444 may schedule terminals for transmission on the forward and/or reverse link. Memories 2442, 2482x and 2482y may store data and program code for base station 110 and terminals 120x and 120y, respectively.

The techniques described herein may be implemented by various means. For example, these techniques may be implemented in hardware, firmware, software, or a combination thereof. For a hardware implementation, the processing units used to perform the techniques at an entity (e.g., a base station or a terminal) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with code (e.g., procedures, functions, modules, instructions, etc.) that performs the functions described herein. In general, any computer/processor-readable medium tangibly embodying firmware and/or software code may be used in implementing the techniques described herein. For example, the firmware and/or software code may be stored in a memory (e.g., memory 2442, 2482$x$ or 2482$y$ in FIG. 24) and executed by a processor (e.g., processor 2440, 2480$x$ or 2480$y$). The memory may be implemented within the processor or external to the processor. The firmware and/or software code may also be stored in a computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The code may be executable by one or more computers/processors and may cause the computer/processor(s) to perform certain aspects of the functionality described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
    at least one processor configured to:
        partition a plurality of logical hop-ports into a plurality of subzones;
        permute the logical hop-ports of each particular subzone of the plurality of subzones within the particular subzone based on a permutation function that is specific to the particular subzone; and
        map the plurality of permuted logical hop-ports to a plurality of physical subcarriers, a number of logical hop-ports in the plurality of logical-hop ports equal to a number of physical subcarriers in the plurality of physical subcarriers; and
    a memory coupled to the at least one processor.

2. The apparatus of claim 1, wherein the permutation function is different for a coverage area of each base station of a plurality of base stations.

3. The apparatus of claim 1, wherein the plurality of subzones includes at least one first useable subzone having a first number of useable logical hop-ports, at least one second useable subzone having a second number of useable logical hop-ports that is less than the first number of useable logical hop-ports, and at least one unusable subzone having no useable logical hop-ports.

4. The apparatus of claim 1, wherein the at least one processor is configured to map the plurality of permuted logical hop-ports to the plurality of physical subcarriers further based on a second permutation function common for all of the plurality of subzones.

5. The apparatus of claim 1, wherein the at least one processor is configured to identify at least one permuted logical hop-port mapped to at least one physical subcarrier occupied by a control segment, and to remap the at least one permuted logical hop-port to at least one physical subcarrier assigned to the control segment.

6. The apparatus of claim 1, wherein the at least one processor is configured to map the plurality of permuted logical hop-ports further to avoid a group of reserved physical subcarriers.

7. The apparatus of claim 1, wherein mapping the plurality of permuted logical hop-ports comprises mapping a block of the permuted logical hop-ports in one of the plurality of subzones to a block of contiguous physical subcarriers among the plurality of physical subcarriers based on a second permutation function.

8. The apparatus of claim 1, wherein mapping the plurality of permuted logical hop-ports comprises mapping a block of the permuted logical hop-ports in one of the plurality of subzones to a designated block of contiguous physical subcarriers among the plurality of physical subcarriers.

9. The apparatus of claim 1, wherein mapping the plurality of permuted logical hop-ports comprises mapping a block of the permuted logical hop-ports in one of the plurality of subzones to a set of physical subcarriers distributed across the plurality of physical subcarriers.

10. The apparatus of claim 1, wherein the at least one processor is configured to determine usable logical hop-ports of the plurality of logical hop-ports.

11. A method for wireless communication, comprising:
    partitioning a plurality of logical hop-ports into a plurality of subzones;
    permuting the logical hop-ports of each particular subzone of the plurality of subzones within the particular subzone based on a permutation function that is specific to the particular subzone; and
    mapping the plurality of permuted logical hop-ports to a plurality of physical subcarriers, a number of logical hop-ports in the plurality of logical-hop ports equal to a number of physical subcarriers in the plurality of physical subcarriers.

12. The method of claim 11, wherein mapping the plurality of permuted logical hop-ports comprises mapping the plurality of permuted logical hop-ports in one of the plurality of subzones to a block of contiguous physical subcarriers among the plurality of physical subcarriers based on a second permutation function.

13. The method of claim 11, wherein mapping the plurality of permuted logical hop-ports comprises mapping the plurality of permuted logical hop-ports in one of the plurality of subzones to a designated block of contiguous physical subcarriers among the plurality of physical subcarriers.

14. The method of claim 11, wherein mapping the plurality of permuted logical hop-ports comprises mapping the plurality of permuted logical hop-ports in one of the plurality of subzones to a set of physical subcarriers distributed across the plurality of physical subcarriers.

15. An apparatus for wireless communication, comprising:
    means for partitioning a plurality of logical hop-ports into a plurality of subzones;
    means for permuting the logical hop-ports of each particular subzone of the plurality of subzones within the particular subzone based on a permutation function that is specific to the particular subzone; and means for mapping the plurality of permuted logical hop-ports to a plurality of physical subcarriers, a number of logical hop-ports in the plurality of logical-hop ports equal to a number of physical subcarriers in the plurality of physical subcarriers.

16. The apparatus of claim 15, wherein mapping the plurality of permuted logical hop-ports comprises mapping the plurality of permuted logical hop-ports in one of the plurality of subzones to a block of contiguous physical subcarriers among the plurality of physical subcarriers based on a second permutation function.

17. The apparatus of claim 15, wherein mapping the plurality of permuted logical hop-ports comprises mapping the plurality of permuted logical hop-ports in one of the plurality of subzones to a designated block of contiguous physical subcarriers among the plurality of physical subcarriers.

18. The apparatus of claim 15, wherein mapping the plurality of permuted logical hop-ports comprises mapping the plurality of permuted logical hop-ports in one of the plurality of subzones to a set of physical subcarriers distributed across the plurality of physical subcarriers.

19. A computer program product, comprising:
a non-transitory computer-readable medium comprising:
code for causing at least one computer to partition a plurality of logical hop-ports into a plurality of subzones;
code for causing the at least one computer to permute the logical hop-ports of each particular subzone of the plurality of subzones within the particular subzone based on a permutation function that is specific to the particular subzone; and
code for causing the at least one computer to map the plurality of permuted logical hop-ports to a plurality of physical subcarriers, a number of logical hop-ports in the plurality of logical-hop ports equal to a number of physical subcarriers in the plurality of physical subcarriers.

20. An apparatus for wireless communication, comprising:
at least one processor configured to:
while a control segment nominally occupies a first plurality of physical subcarriers, map a logical hop-port to a first physical subcarrier outside the first plurality of physical subcarriers based on at least one permutation function; and
in response to the control segment hopping from the first plurality of physical subcarriers to a second plurality of physical subcarriers that includes the first physical subcarrier, remap the logical hop-port to a second physical subcarrier within the first plurality of physical subcarriers; and
a memory coupled to the at least one processor.

21. The apparatus of claim 20, wherein the control segment comprises a Code Division Multiple Access (CDMA) subsegment occupying a group of contiguous physical subcarriers in each frame in which the CDMA subsegment is sent.

22. The apparatus of claim 20, wherein the first and second pluralities of physical subcarriers overlap, and wherein the physical subcarriers in the first plurality of physical subcarriers and not in the second plurality of physical subcarriers are available for remapping.

23. A method for wireless communication, comprising:
while a control segment nominally occupies a first plurality of physical subcarriers, mapping a logical hop-port to a first physical subcarrier outside the first plurality of physical subcarriers based on at least one permutation function; and
in response to the control segment hopping from the first plurality of physical subcarriers to a second plurality of physical subcarriers that includes the first physical subcarrier, remapping the logical hop-port to a second physical subcarrier within the first plurality of physical subcarriers.

24. An apparatus for wireless communication, comprising:
at least one processor configured to:
determine a first logical hop-port assigned to a control segment, the first logical hop-port mapped to a first physical subcarrier assigned to the control segment;
determine a second logical hop-port to exchange with the first logical hop-port, the second logical hop-port mapped to a second physical subcarrier; and
assign the second physical subcarrier instead of the first physical subcarrier to the control segment; and
a memory coupled to the at least one processor.

25. The apparatus of claim 24, wherein the at least one processor is configured to assign the first physical subcarrier to a transmission assigned to the second logical hop-port.

26. The apparatus of claim 24, wherein the at least one processor is configured to:
determine a first set of logical hop-ports assigned to the control segment, the first set comprising the first logical hop-port,
determine a second set of logical hop-ports to exchange with the first set of logical hop-ports, the second set comprising the second logical hop-port,
map the first set of logical hop-ports to a first set of physical subcarriers,
map the second set of logical hop-ports to a second set of physical subcarriers, and
assign the second set of physical subcarriers instead of the first set of physical subcarriers to the control segment.

27. The apparatus of claim 26, wherein the logical hop-ports in the first set are distributed across a configurable number of subzones, and wherein the logical hop-ports in the second set are distributed across three hopping zones associated with three corresponding intra-zone permutations, each intra-zone permutation having a size equal to a size of the corresponding hopping zone.

28. A method for wireless communication, comprising:
determining a first logical hop-port assigned to a control segment, the first logical hop-port mapped to a first physical subcarrier assigned to the control segment;
determining a second logical hop-port to exchange with the first logical hop-port, the second logical hop-port mapped to a second physical subcarrier; and
assigning the second physical subcarrier instead of the first physical subcarrier to the control segment.

29. The method of claim 28, further comprising:
determining a first set of logical hop-ports assigned to the control segment, the first set comprising the first logical hop-port;
determining a second set of logical hop-ports to exchange with the first set of logical hop-ports, the second set comprising the second logical hop-port;
mapping the first set of logical hop-ports to a first set of physical subcarriers;
mapping the second set of logical hop-ports to a second set of physical subcarriers; and
assigning the second set of physical subcarriers instead of the first set of physical subcarriers to the control segment.

30. The method of claim 28, wherein the logical hop-ports in the first set are distributed across a configurable number of subzones, and wherein the logical hop-ports in the second set are distributed across three hopping zones associated with three corresponding intra-zone permutations, each intra-zone permutation having a size equal to a size of the corresponding hopping zone.

31. An apparatus for wireless communication, comprising:
at least one processor configured to:
map logical hop-ports to a plurality of physical subcarriers by performing local hopping during a first time interval, the local hopping performed based on a first permutation function that is specific to a particular subzone of logical hop-ports and specific to a particular coverage area of a particular base station of a plurality of base stations; and
map the logical hop-ports to the plurality of physical subcarriers by performing global hopping during a second time interval, the global hopping performed based on a second permutation function that is common to all coverage areas of all base stations of the plurality of base stations and based on a third permutation function that is specific to the particular coverage area and to the particular subzone; and
a memory coupled to the at least one processor.

32. The apparatus of claim 31, wherein the at least one processor is configured to map a block of the logical hop-ports to a block of physical subcarriers within a zone of the plurality of physical subcarriers to perform the local hopping, and to map the block of the logical hop-ports to physical subcarriers anywhere within system bandwidth to perform the global hopping.

33. The apparatus of claim 31, wherein the at least one processor is configured to map a block of the logical hop-ports to a block of contiguous physical subcarriers within a zone of the plurality of physical subcarriers to perform the local hopping, and to map the block of the logical hop-ports to a set of physical subcarriers distributed across the plurality of physical subcarriers to perform the global hopping.

34. The apparatus of claim 31, wherein the first time interval is for a first interlace and the second time interval is for a second interlace for hybrid automatic repeat request (HARQ).

35. The apparatus of claim 31, wherein the at least one processor is configured to perform local hopping for a first group of subcarriers and to perform global hopping for a second group of subcarriers during the same time interval, wherein a globally hopped transmission replaces a locally hopped transmission when a corresponding globally hopped subcarrier and a corresponding locally hopped subcarrier are the same.

36. A method for wireless communication, comprising:
mapping logical hop-ports to a plurality of physical subcarriers by performing local hopping during a first time interval, the local hopping performed based on a first permutation function that is specific to a particular subzone of logical hop-ports and specific to a particular coverage area of a particular base station of a plurality of base stations; and
mapping the logical hop-ports to the plurality of physical subcarriers by performing global hopping during a second time interval, the global hopping performed based on a second permutation function that is common to all coverage areas of all base stations of the plurality of base stations and based on a third permutation function that is specific to the particular coverage area and to the particular subzone.

37. The method of claim 36, wherein performing the local hopping comprises mapping a block of logical hop-ports to a block of physical subcarriers within a zone of the plurality of physical subcarriers, and wherein performing the global hopping comprises mapping the block of logical hop-ports to a block of physical subcarriers.

38. The method of claim 36, wherein performing the local hopping comprises mapping a block of the logical hop-ports to a block of contiguous physical subcarriers within a zone of the plurality of physical subcarriers, and wherein performing the global hopping comprises mapping a block of the logical hop-ports to a set of physical subcarriers distributed across the plurality of physical subcarriers.

39. The method of claim 36, further comprising performing local hopping for a first group of subcarriers and performing global hopping for a second group of subcarriers during the same time interval, wherein a globally hopped transmission replaces a locally hopped transmission when a corresponding globally hopped subcarrier and a corresponding locally hopped subcarrier are the same.

* * * * *